United States Patent
Hosoda et al.

(10) Patent No.: US 11,218,617 B2
(45) Date of Patent: *Jan. 4, 2022

(54) COMMUNICATION SYSTEM, MOBILE TERMINAL, METHOD OF CONTROLLING THE MOBILE TERMINAL, AND STORAGE MEDIUM

(71) Applicant: CANON KABUSHIKI KAISHA, Tokyo (JP)

(72) Inventors: Yasuhiro Hosoda, Abiko (JP); Fumio Mikami, Abiko (JP); Hiroki Matsushima, Kawasaki (JP); Yukimasa Sato, Kashiwa (JP); Kyohei Takeda, Toride (JP); Tomoko Adachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,281

(22) Filed: Feb. 18, 2020

(65) Prior Publication Data

US 2020/0186670 A1 Jun. 11, 2020

Related U.S. Application Data

(63) Continuation of application No. 16/214,549, filed on Dec. 10, 2018, now Pat. No. 10,609,248, which is a (Continued)

(30) Foreign Application Priority Data

Sep. 24, 2014 (JP) .................................. 2014-194300

(51) Int. Cl.
*H04N 1/327* (2006.01)
*G06F 3/12* (2006.01)
(Continued)

(52) U.S. Cl.
CPC ....... *H04N 1/32791* (2013.01); *G06F 3/1203* (2013.01); *G06F 3/1229* (2013.01);
(Continued)

(58) Field of Classification Search
USPC ......... 358/1.1–3.29, 1.1–1.18; 707/617–622, 707/767–770; 709/222–232, 237–250
See application file for complete search history.

(56) References Cited

U.S. PATENT DOCUMENTS 5,537,550 A 7/1996 Russell
5,883,724 A * 3/1999 Yamada ............. H04N 1/00915
355/127

(Continued)

FOREIGN PATENT DOCUMENTS

CN 101064535 A 10/2007
CN 102685330 A 9/2012
(Continued)

OTHER PUBLICATIONS

Office Action issued in Japanese Appln. No. 2018-230284 dated Apr. 3, 2020.
(Continued)

*Primary Examiner* — Marcellus J Augustin
(74) *Attorney, Agent, or Firm* — Rossi, Kimms & McDowell LLP

(57) ABSTRACT

A communication system comprising an information processing apparatus and a mobile terminal, wherein when the mobile terminal receives a packet transmitted from the information processing apparatus, it determines whether or not a login condition for transmitting a login request is satisfied based on a received signal strength of the packet, and it transmits the login request to the information processing apparatus in a case where it determines that the login condition is satisfied, and does not transmit the login request (Continued)

to the information processing apparatus in a case where it is determines that the login condition is not satisfied.

20 Claims, 25 Drawing Sheets

Related U.S. Application Data continuation of application No. 15/508,232, filed as application No. PCT/JP2015/004565 on Sep. 8, 2015, now Pat. No. 10,225,435.

(51) Int. Cl.
| | | |
|---|---|---|
| *H04N 1/44* | (2006.01) | |
| *H04M 1/72412* | (2021.01) | |
| *H04M 1/72415* | (2021.01) | |
| *H04M 1/72445* | (2021.01) | |
| *H04M 1/72457* | (2021.01) | |

(52) U.S. Cl.
CPC .......... *G06F 3/1236* (2013.01); *G06F 3/1292* (2013.01); *H04M 1/72412* (2021.01); *H04M 1/72415* (2021.01); *H04M 1/72445* (2021.01); *H04M 1/72457* (2021.01); *H04N 1/32776* (2013.01); *H04N 1/4413* (2013.01); *H04N 1/4426* (2013.01); *G06F 3/1239* (2013.01); *H04N 2201/0055* (2013.01); *H04N 2201/0094* (2013.01)

(56) References Cited

U.S. PATENT DOCUMENTS

| | | | |
|---|---|---|---|
| 8,493,582 B2 | 7/2013 | Murakami | |
| 8,595,727 B2* | 11/2013 | Nakahara | G06F 21/608 |
| | | | 718/100 |
| 8,934,113 B2 | 1/2015 | Hosoda | |
| 9,198,043 B2 | 11/2015 | Kita | |
| 9,503,587 B2 | 11/2016 | Naruse | |
| 2006/0271674 A1* | 11/2006 | Harada | H04L 67/14 |
| | | | 709/224 |
| 2007/0213008 A1* | 9/2007 | Lee | H04B 7/02 |
| | | | 455/41.2 |
| 2008/0007767 A1 | 1/2008 | Ishimaru | |
| 2008/0189716 A1 | 8/2008 | Nakahara | |
| 2010/0020355 A1 | 1/2010 | Imai | |
| 2011/0061016 A1 | 3/2011 | Song | |
| 2011/0281583 A1 | 11/2011 | Hole | |
| 2012/0003932 A1 | 1/2012 | Zhodzishsky | |
| 2012/0142271 A1 | 6/2012 | Zhodzishsky | |
| 2012/0192257 A1 | 7/2012 | Ishii | |
| 2012/0250059 A1 | 10/2012 | Itogawa | |
| 2013/0063759 A1* | 3/2013 | Kutoh | G06F 21/40 |
| | | | 358/1.14 |
| 2013/0346494 A1 | 12/2013 | Nakfour | |
| 2014/0168702 A1 | 6/2014 | Morita | |
| 2014/0181510 A1 | 6/2014 | Kita | |
| 2014/0295905 A1 | 10/2014 | Koskinen | |
| 2014/0359737 A1 | 12/2014 | Ishizu | |
| 2015/0025947 A1* | 1/2015 | Dutta | G06Q 20/3224 |
| | | | 705/13 |
| 2015/0089621 A1 | 3/2015 | Khalid | |
| 2016/0232515 A1* | 8/2016 | Jhas | G06Q 30/06 |
| 2016/0373611 A1 | 12/2016 | Okigami | |
| 2017/0134609 A1* | 5/2017 | Park | G06Q 30/02 |
| 2018/0176833 A1 | 6/2018 | Shibutani | |

FOREIGN PATENT DOCUMENTS

| | | |
|---|---|---|
| JP | 2006153981 A | 6/2006 |
| JP | 2007181154 A | 7/2007 |
| JP | 2008017381 A | 1/2008 |
| JP | 2008200898 A | 9/2008 |
| JP | 2009015422 A | 1/2009 |
| JP | 2010219680 A | 9/2010 |
| JP | 2011065369 A | 3/2011 |
| JP | 2011227760 A | 11/2011 |
| JP | 2013183215 A | 9/2013 |
| JP | 2013187568 A | 9/2013 |
| JP | 2014016674 A | 1/2014 |
| JP | 2014026163 A | 2/2014 |
| JP | 2014060479 A | 4/2014 |
| JP | 2014068304 A | 4/2014 |
| JP | 2014072627 A | 4/2014 |
| JP | 2014110638 A | 6/2014 |
| JP | 2014123191 A | 7/2014 |
| JP | 2014175882 A | 9/2014 |
| JP | 6799576 B2 | 12/2020 |
| WO | 2008117565 A1 | 10/2008 |

OTHER PUBLICATIONS

International Search Report issued in Intl. Appln. No. PCT/JP2015/004565 dated Dec. 1, 2015.
Written Opinion issued in Intl. Appln. No. PCT/JP2015/004565 dated Dec. 1, 2015.
Office Action issued in Japanese Appln No. 2014-194300 dated Sep. 30, 2016.
Office Action issued in Japanese Appln No. 2014-194300 dated Mar. 10, 2017.
Decision to Dismiss the Amendment issued in Japanese Patent Application No. 2014-194300 dated Jul. 28, 2017.
Office Action issued in Japanese Appln. No. 2018-176146 dated Oct. 15, 2018.
Zheng. "Bluetooth Low Energy Starter Guide." Shuwa System Co., Ltd. Jul. 1, 2014: 140-157. Chapter 6. Edition 1. Japan.
Office Action issued in U.S. Appl. No. 15/508,232 dated Feb. 9, 2018.
Office Action issued in U.S. Appl. No. 15/508,232 dated Aug. 31, 2018.
Notice of Allowance issued in U.S. Appl. No. 15/508,232 dated Sep. 18, 2018.
Office Action issued in Chinese Appln. No. 201580050768.2 dated Dec. 24, 2018. English translation provided.
Office Action issued in Japanese Appln. No. 2018-230284 dated Dec. 6, 2019.
Office Action issued in U.S. Appl. No. 16/214,549 dated Jan. 23, 2019.
Office Action issued in U.S. Appl. No. 16/214,549 dated Jul. 19, 2019.
Notice of Allowance issued in U.S. Appl. No. 16/214,549 dated Dec. 5, 2019.
Explanation of Circumstances Concerning Accelerated Examination issued in Japanese Application No. 2020-194580 dated Dec. 17, 2020.
Office Action issued in Japanese Appln. No. 2020-194580 dated Mar. 8, 2021.
Office Action issued in Japanese Appln. No. 2020-194580 dated Nov. 19, 2021.

\* cited by examiner

[Fig. 1]
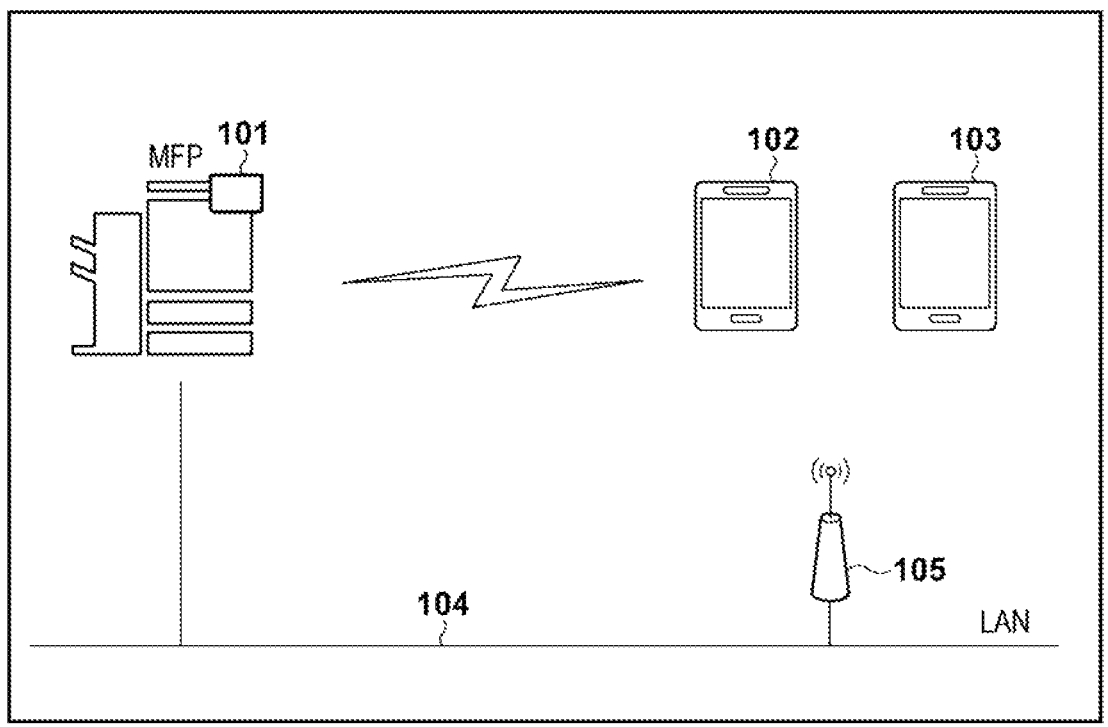

[Fig. 2]
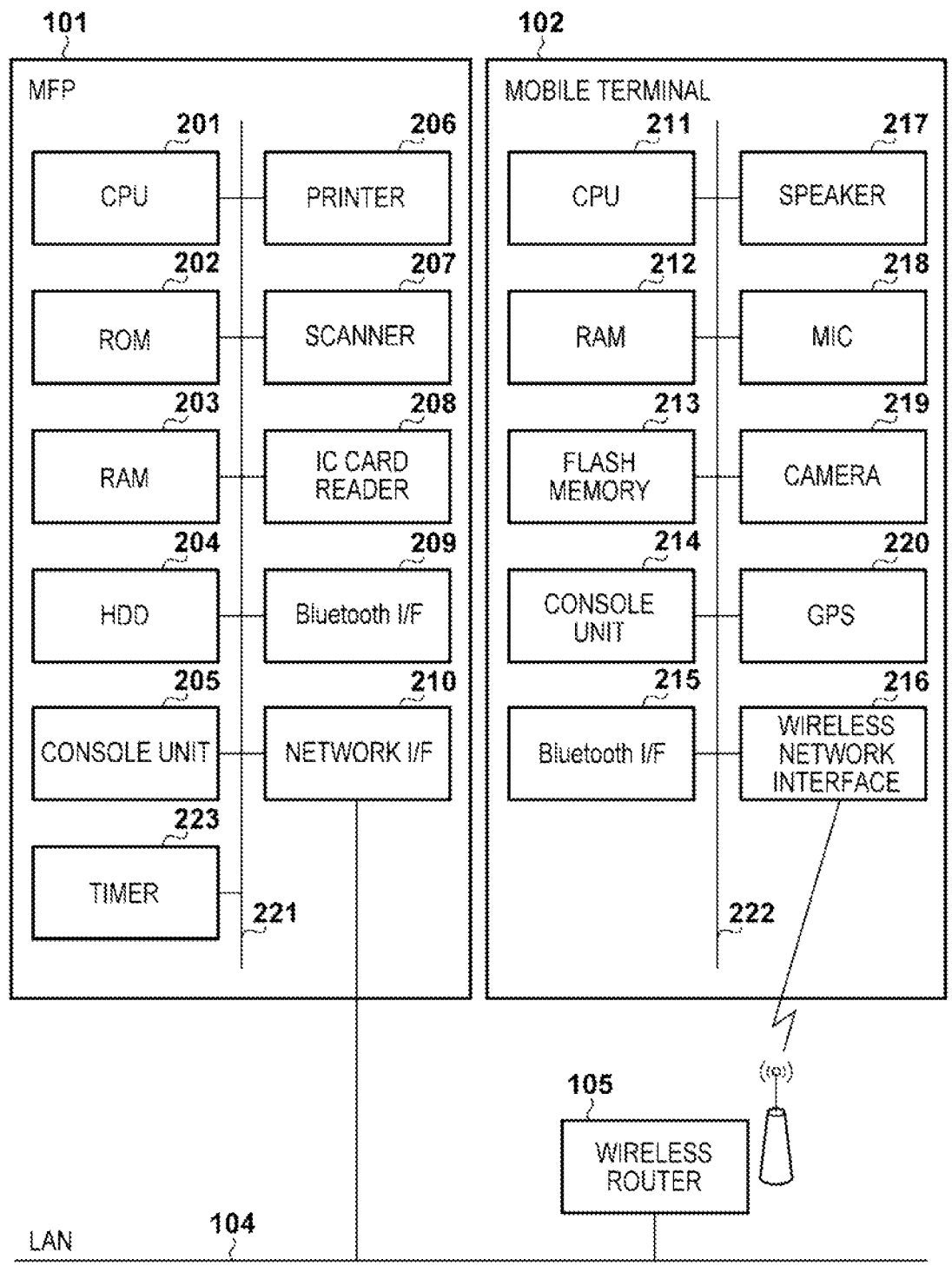

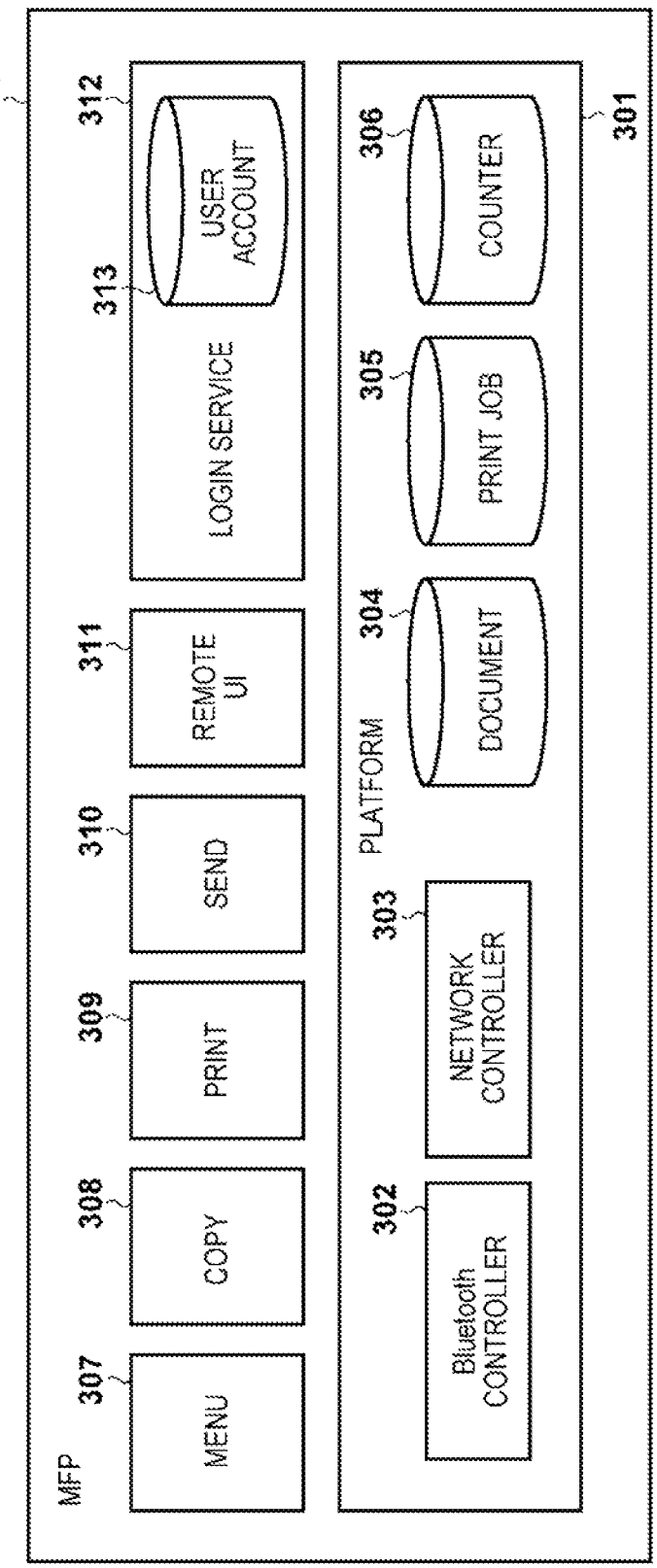
[Fig. 3A]

[Fig. 3B]
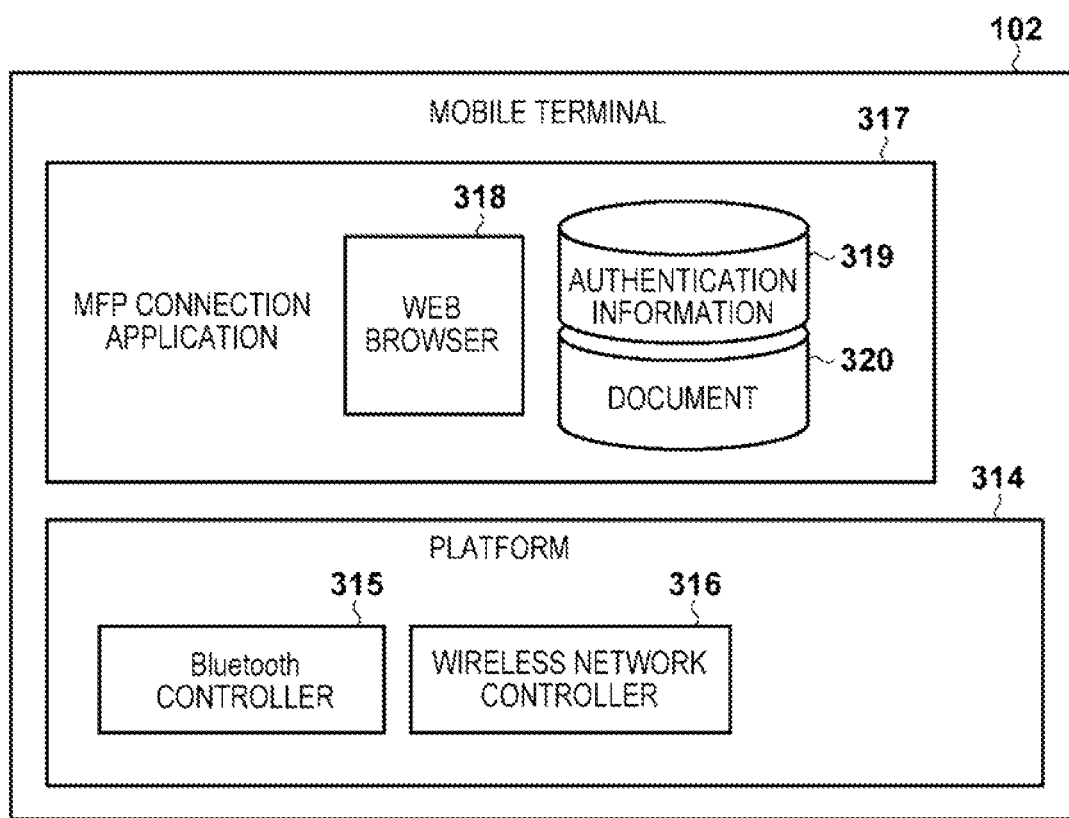

[Fig. 4]
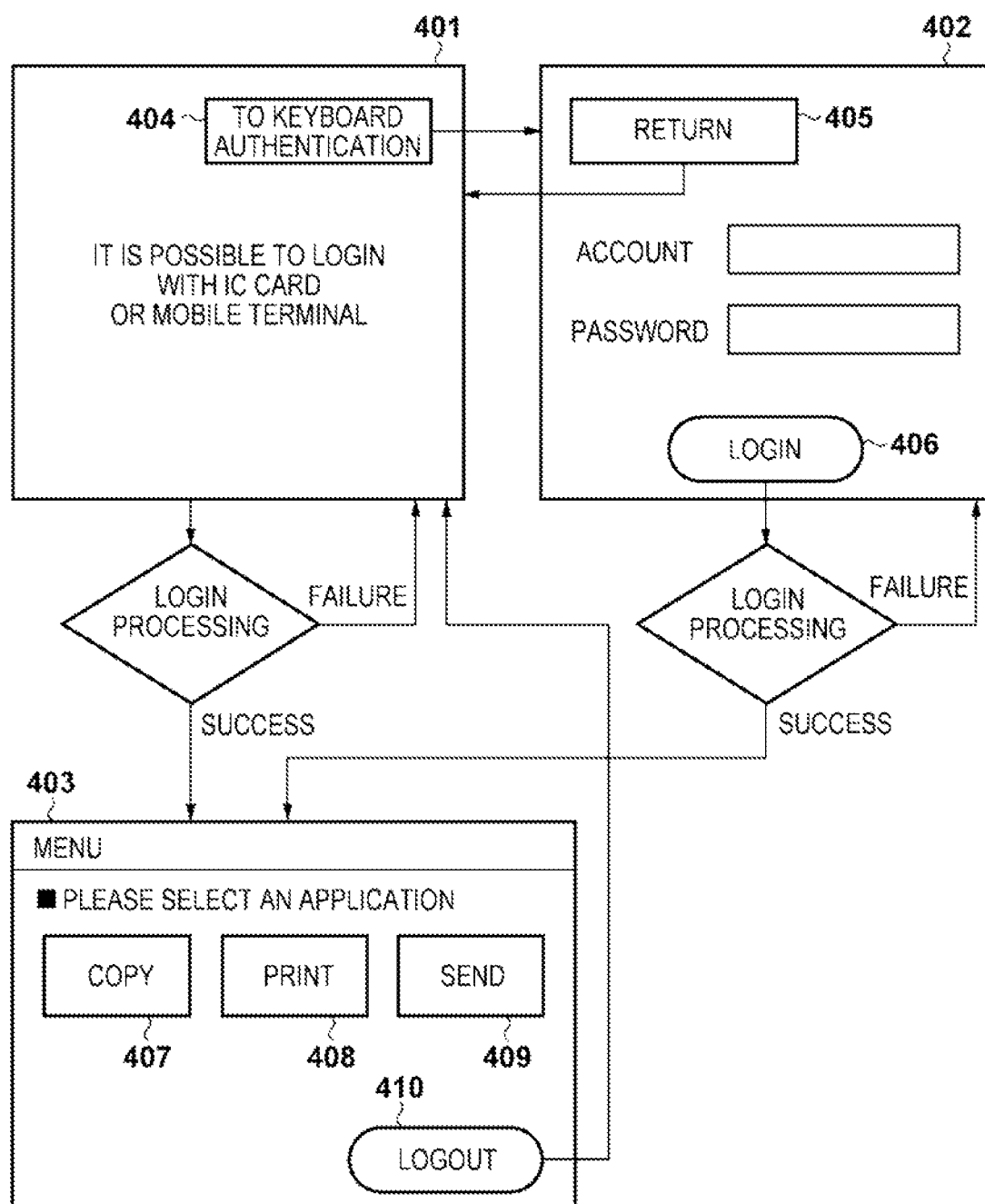

[Fig. 5]
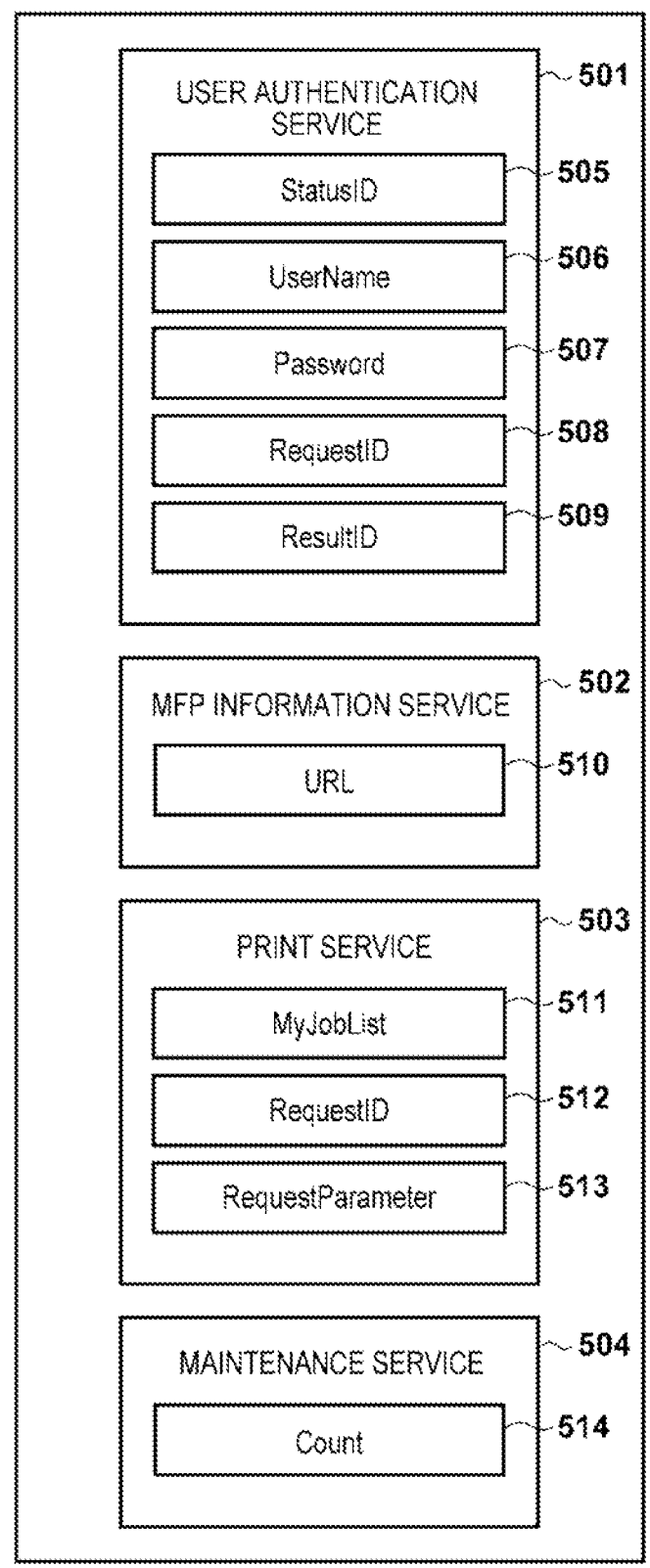

[Fig. 6]
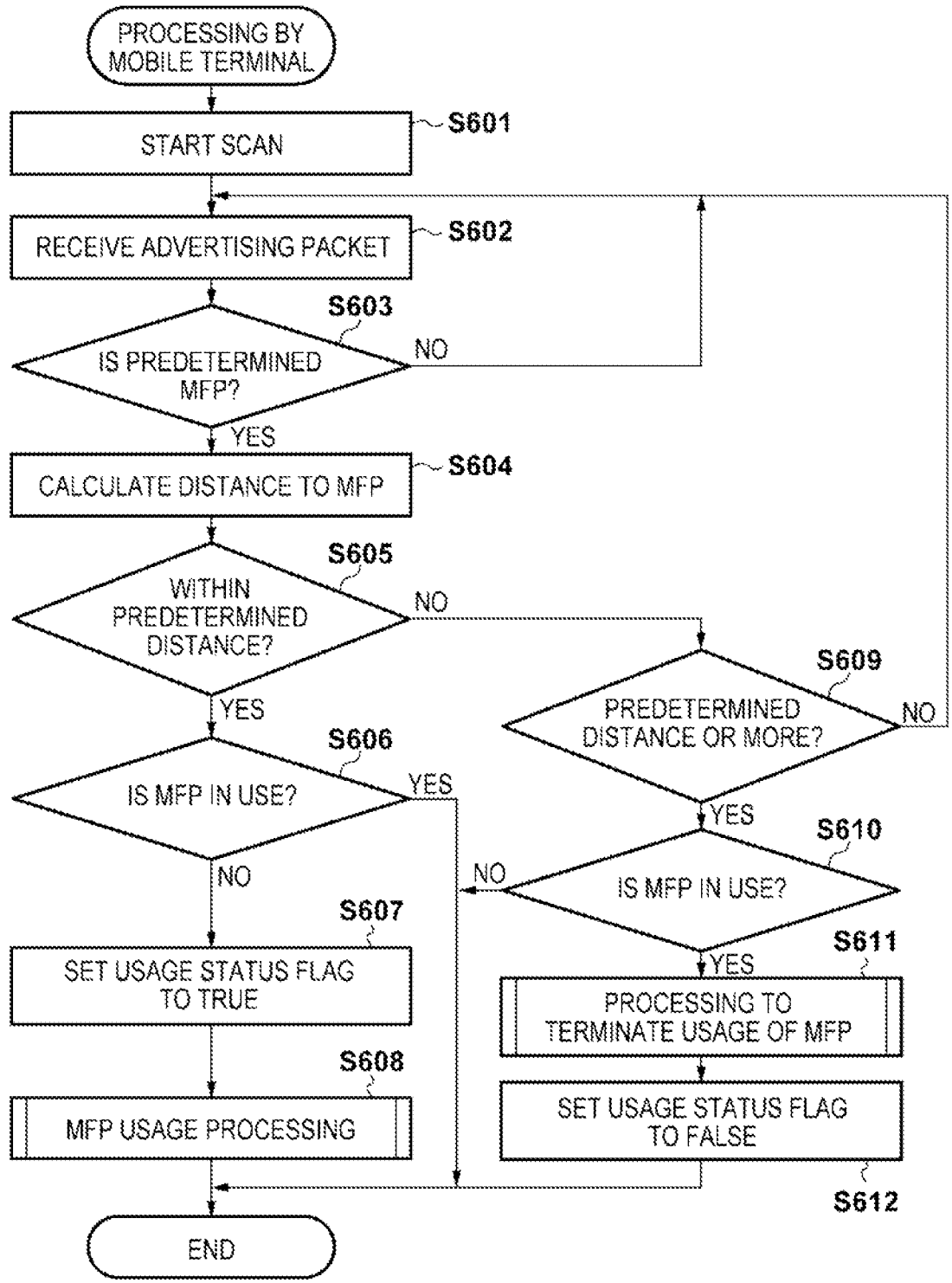

[Fig. 7]
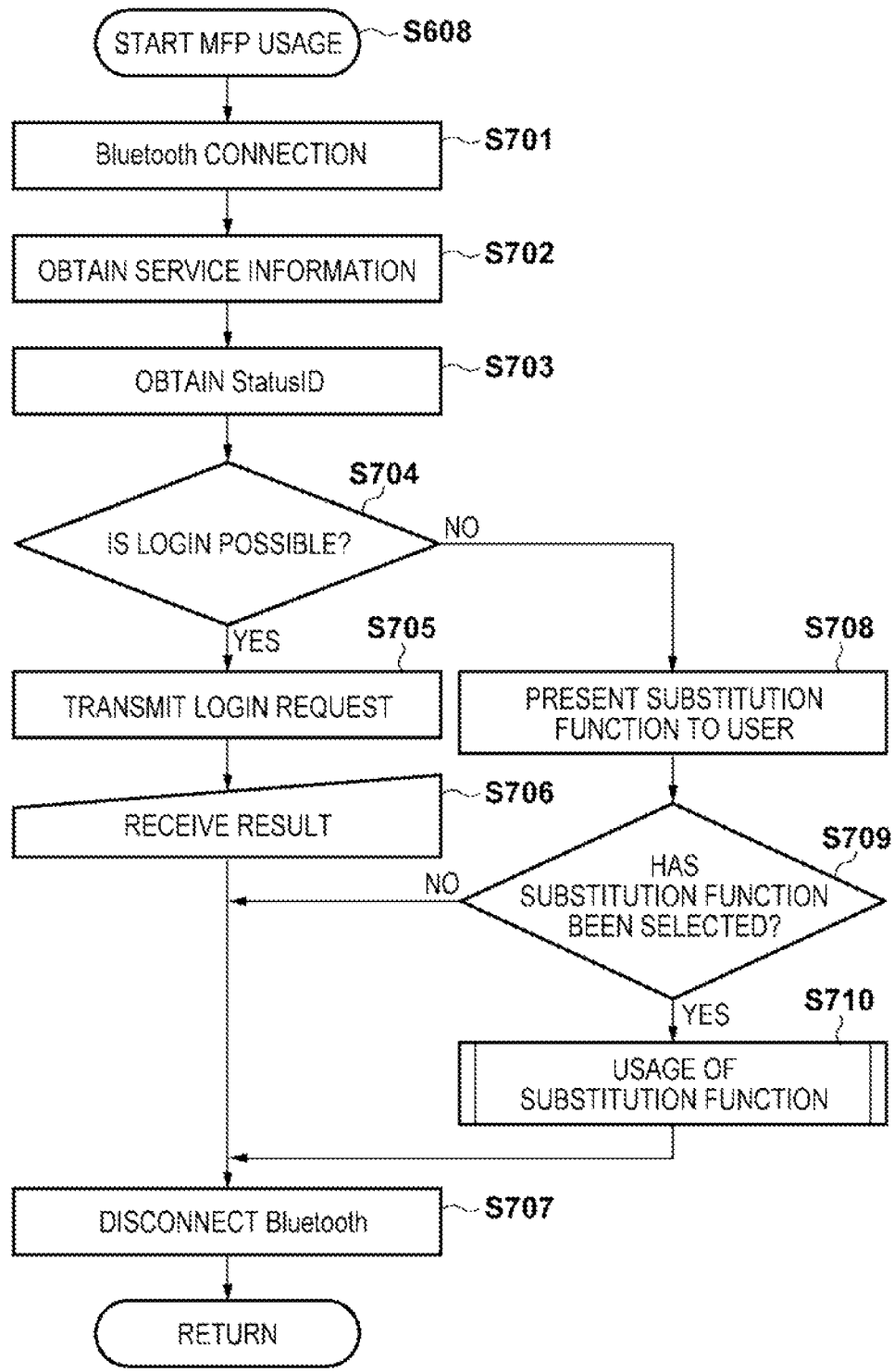

[Fig. 8]
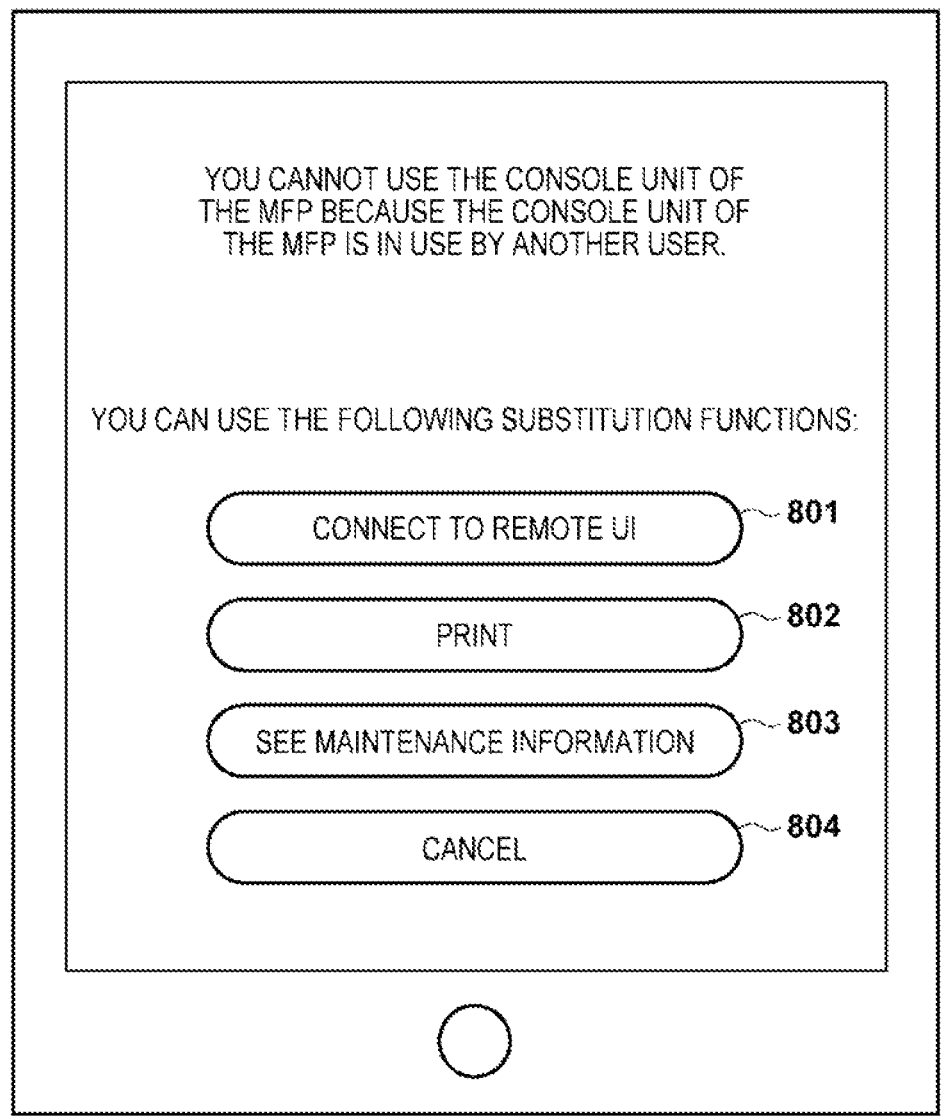

[Fig. 9]
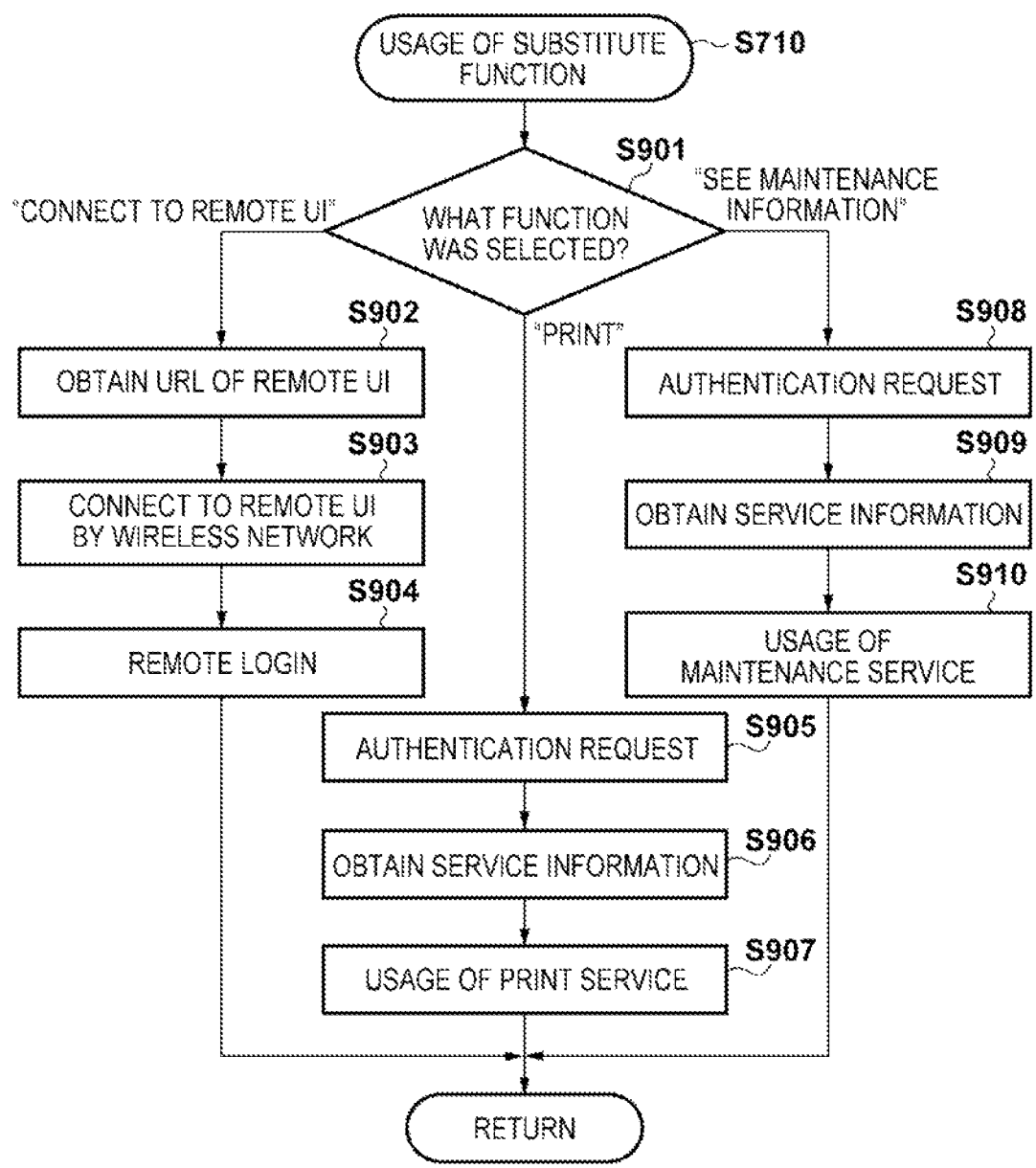

[Fig. 10]
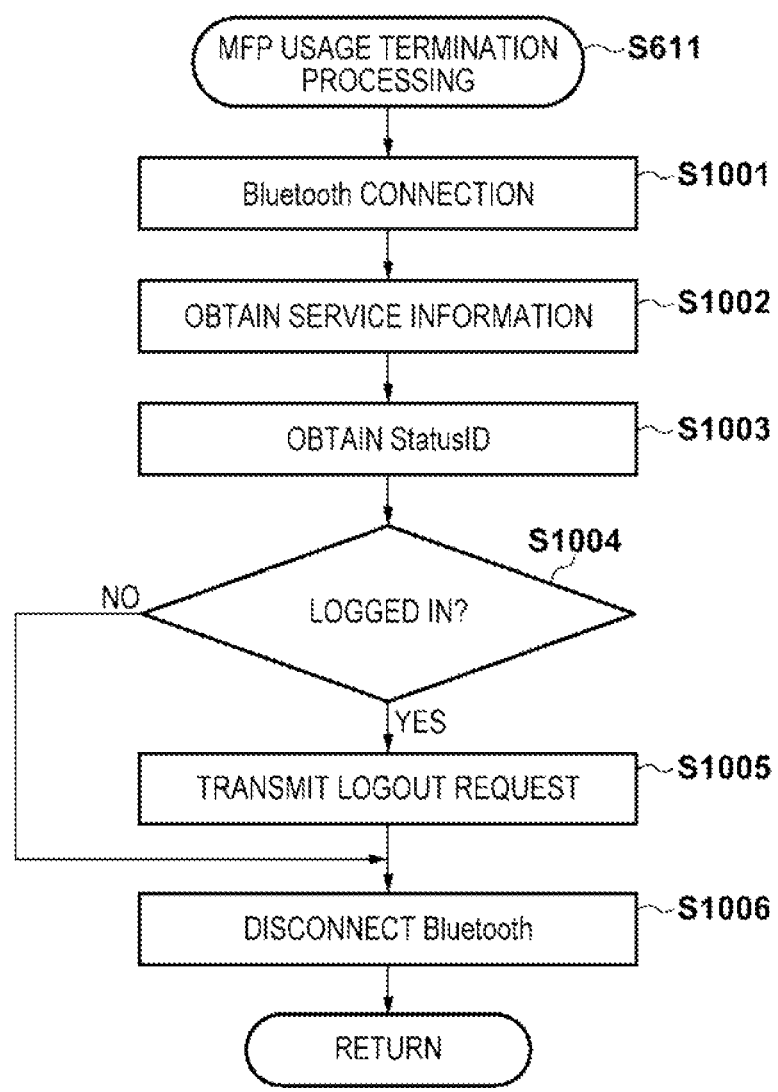

[Fig. 11]
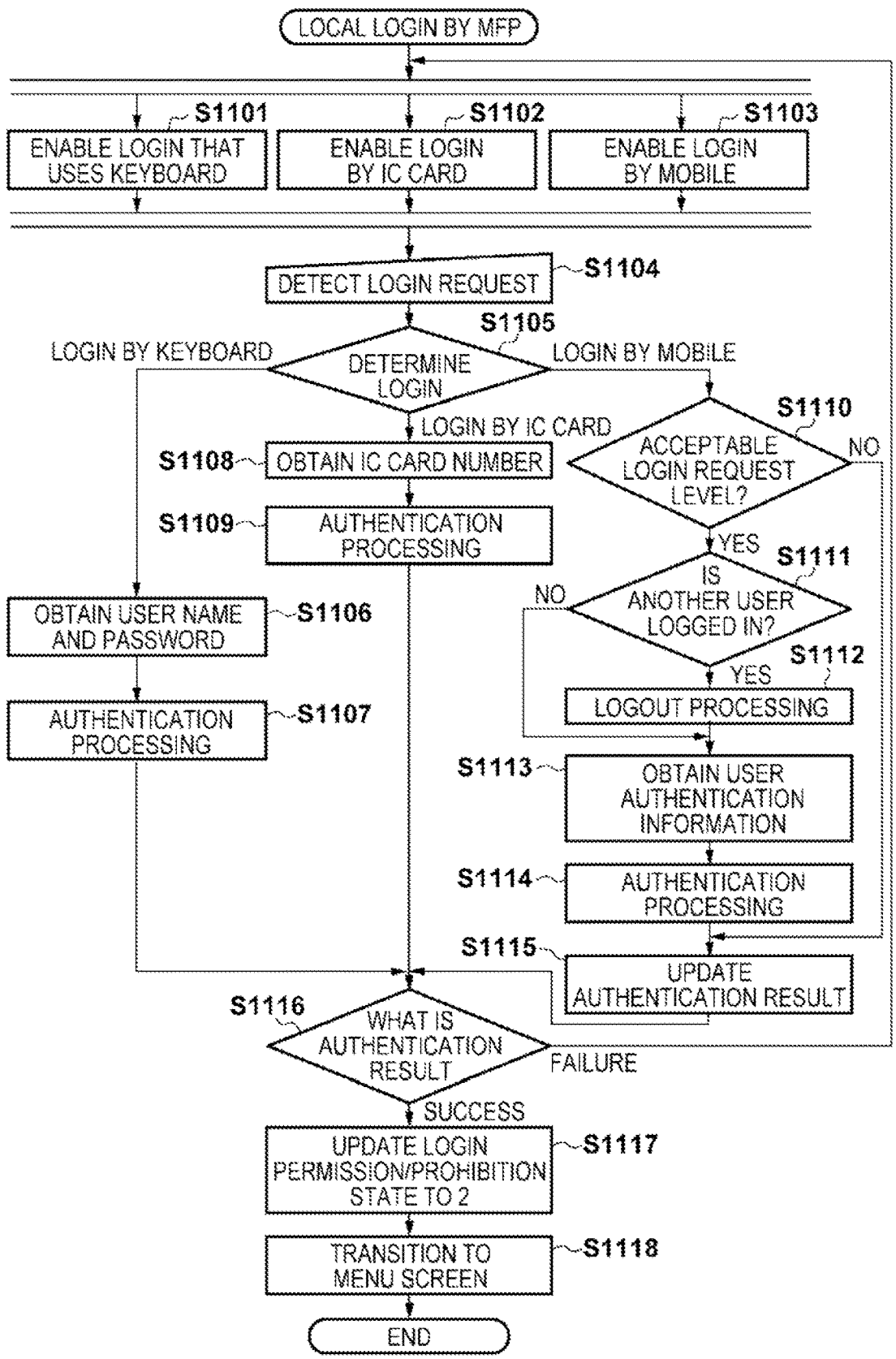

[Fig. 12]
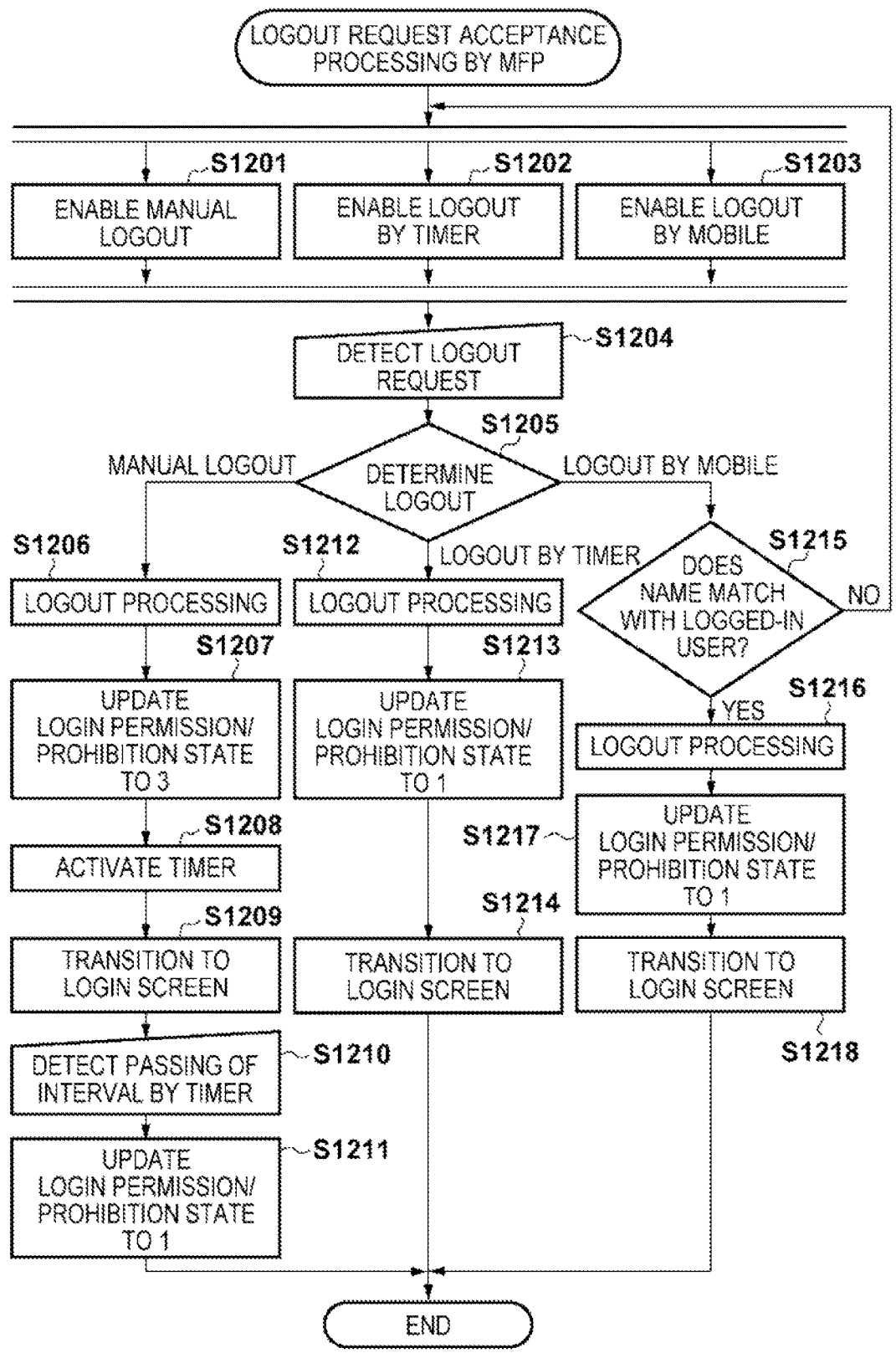

[Fig. 13]
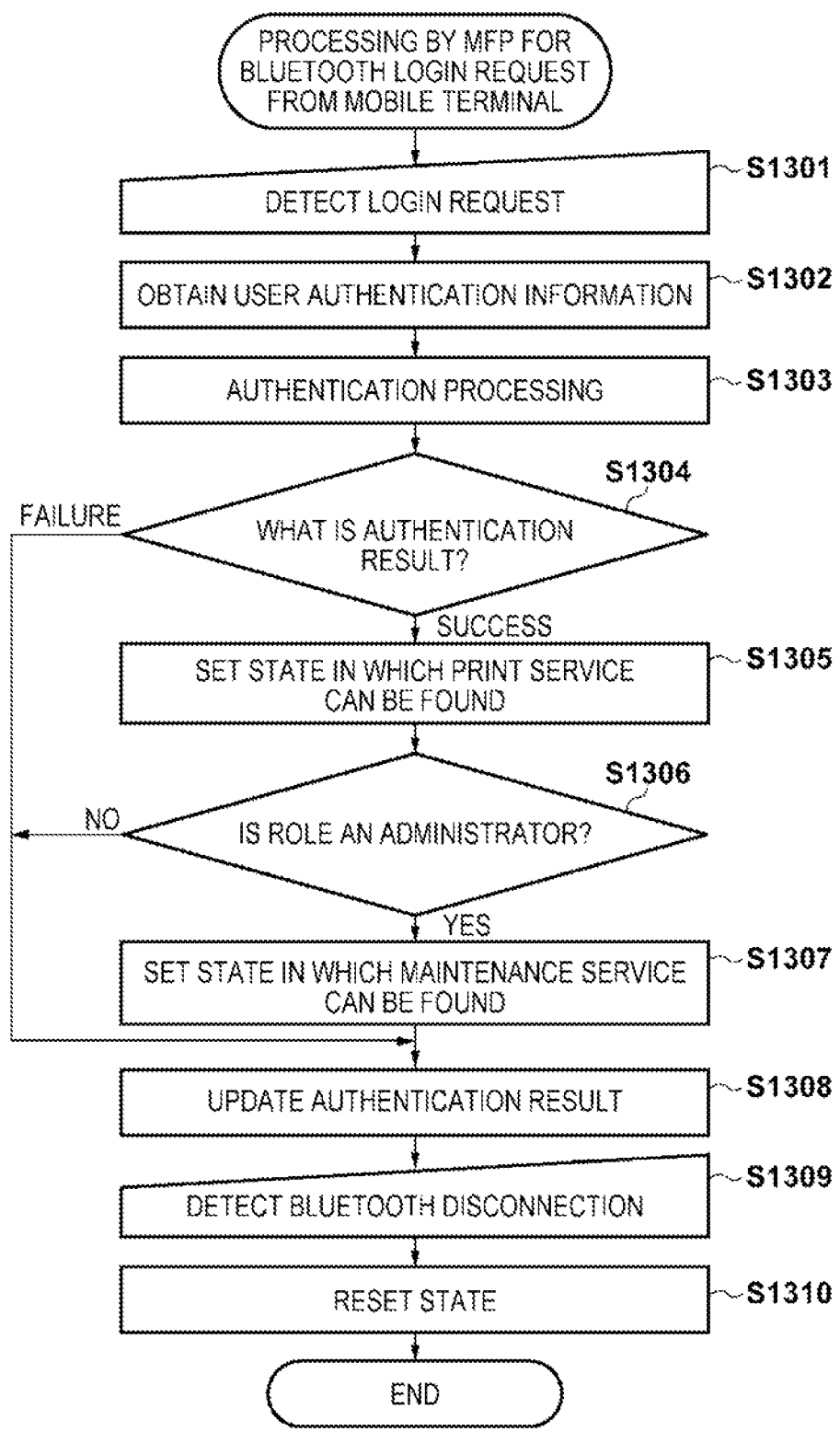

[Fig. 14A]
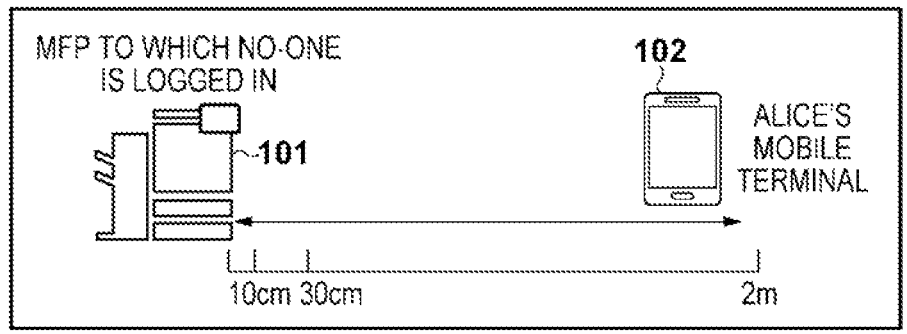
[Fig. 14B]
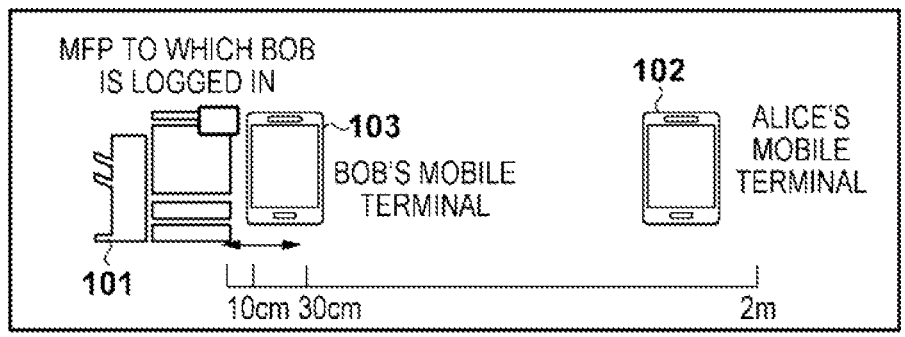
[Fig. 14C]
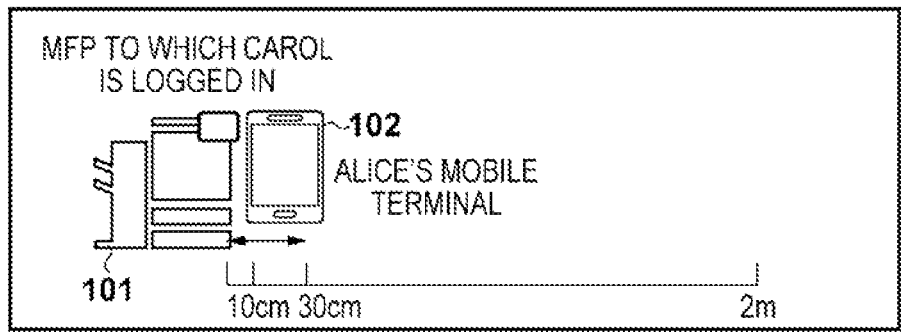
[Fig. 14D]
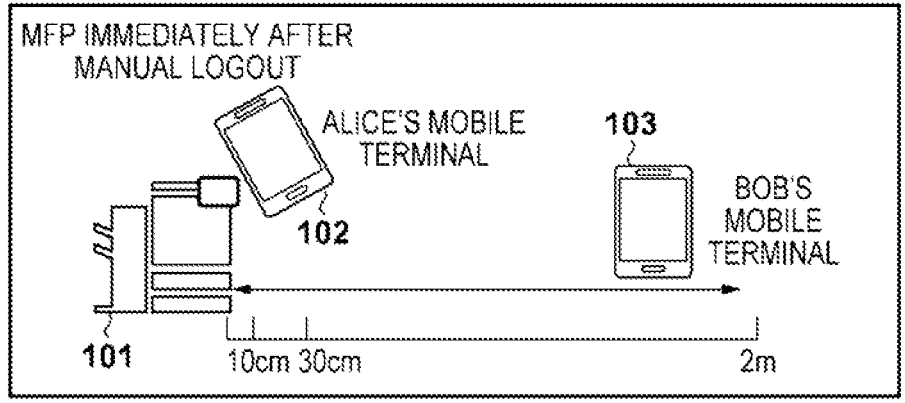

[Fig. 15]
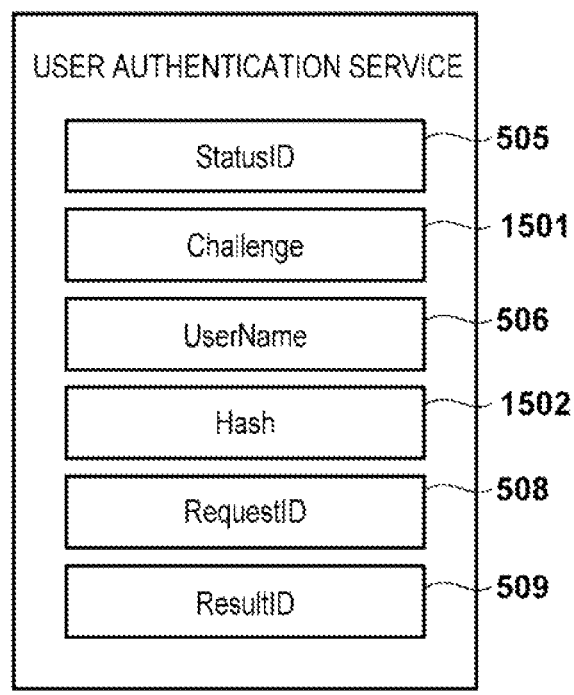
[Fig. 16]
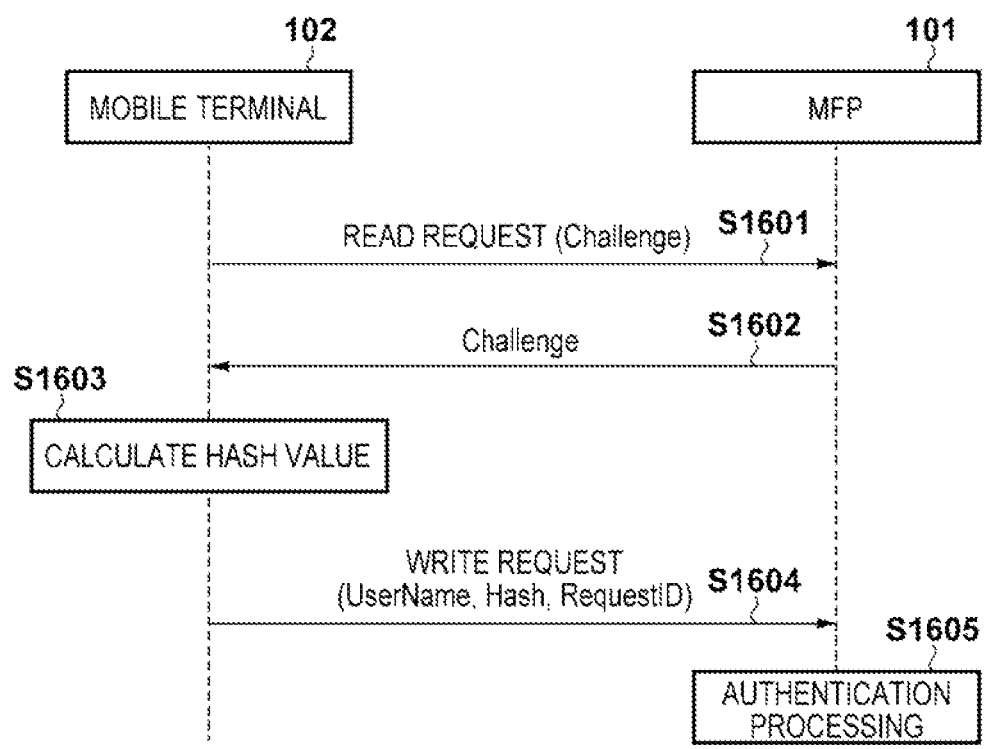

[Fig. 17]
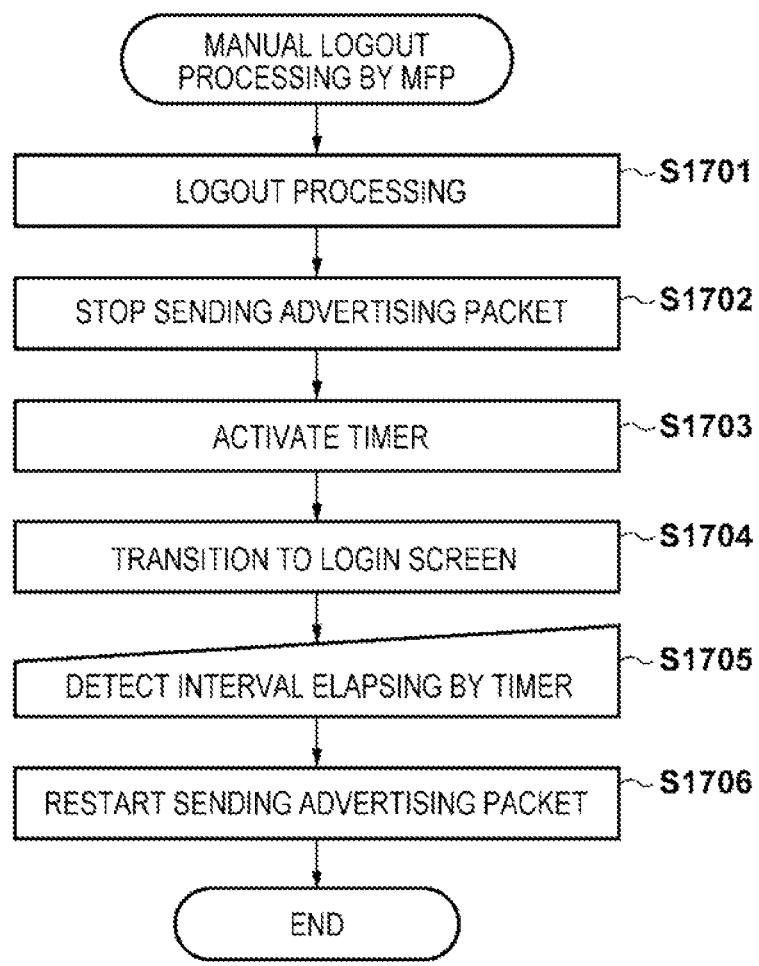

[Fig. 18A]
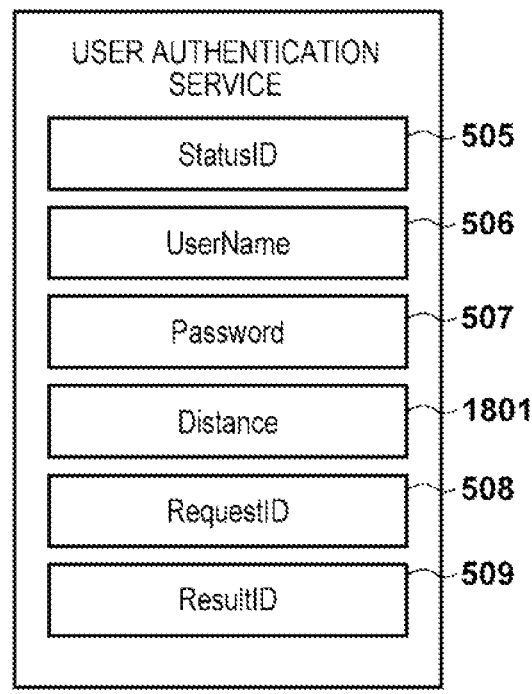
[Fig. 18B]
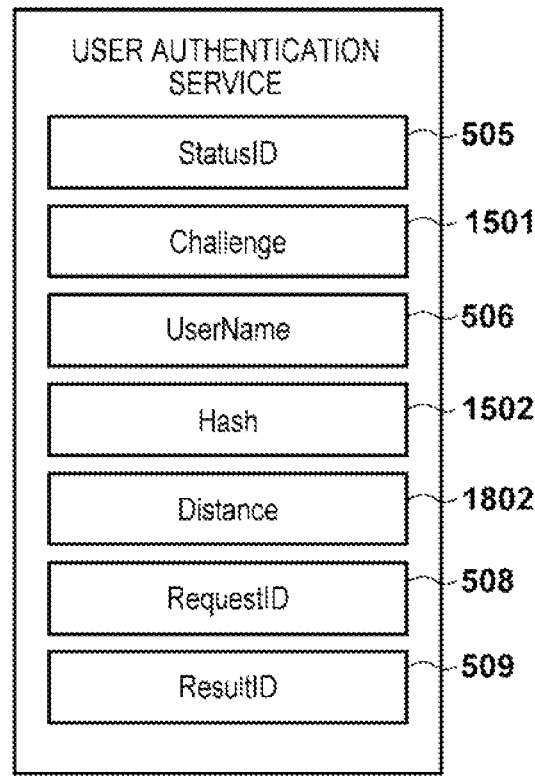

[Fig. 19]
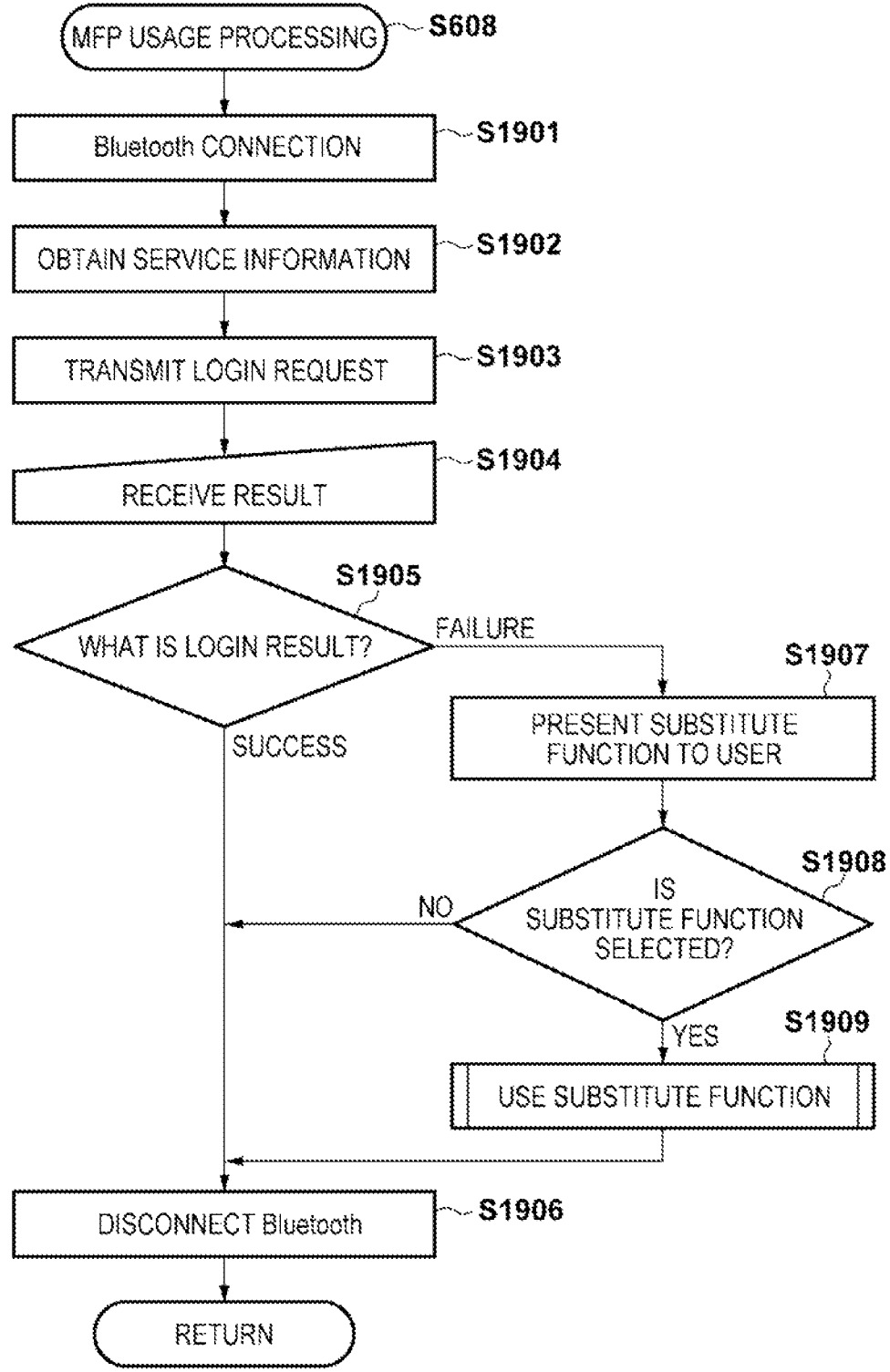

[Fig. 20A]
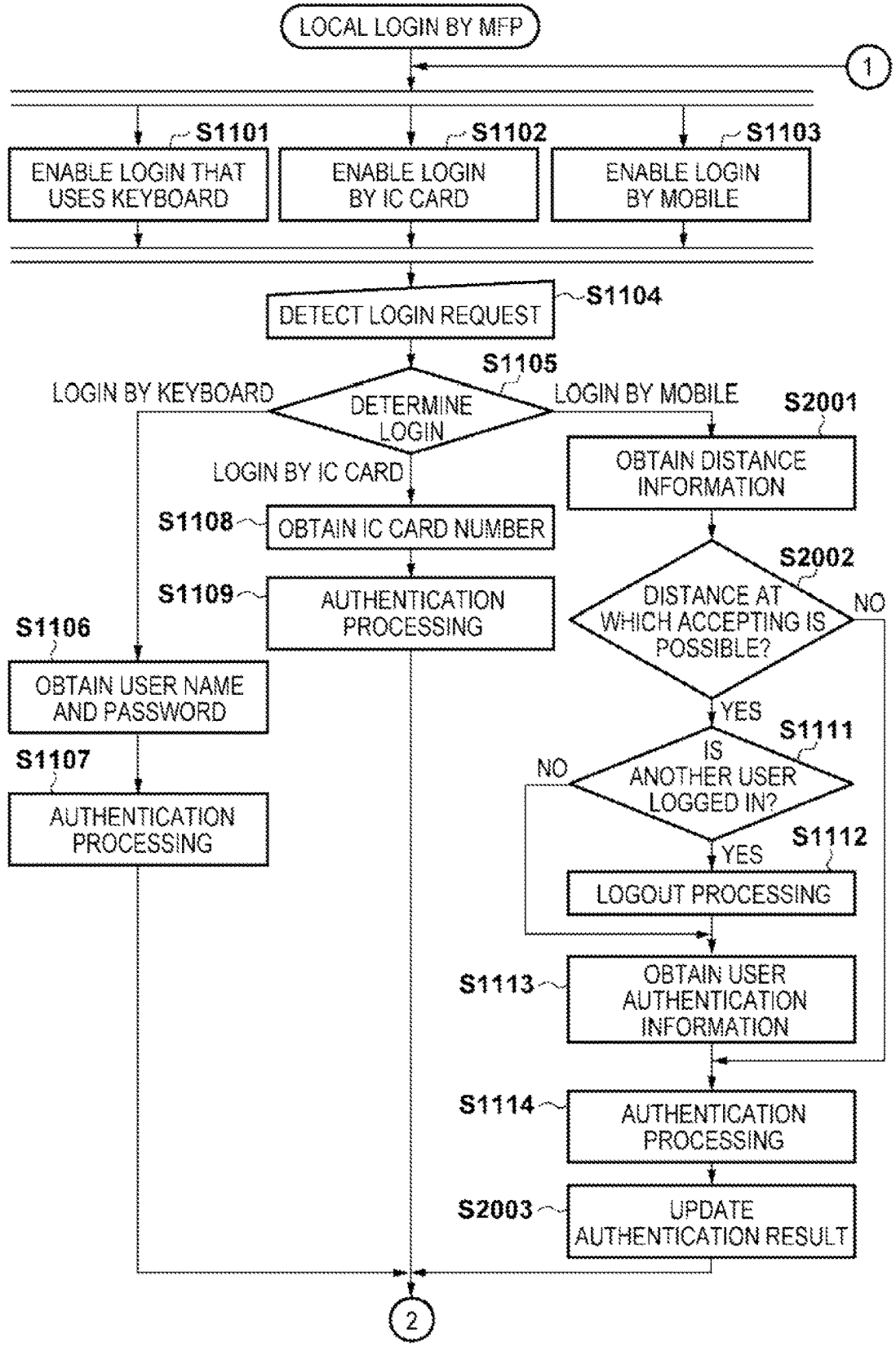

[Fig. 20B]
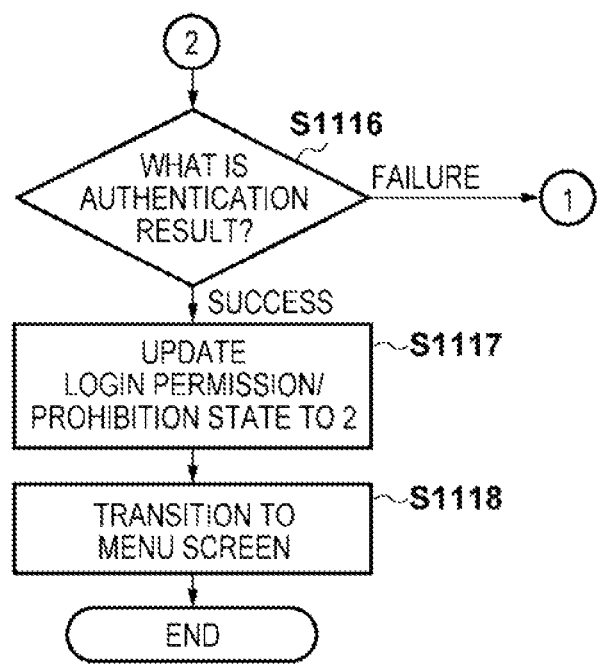

[Fig. 21]
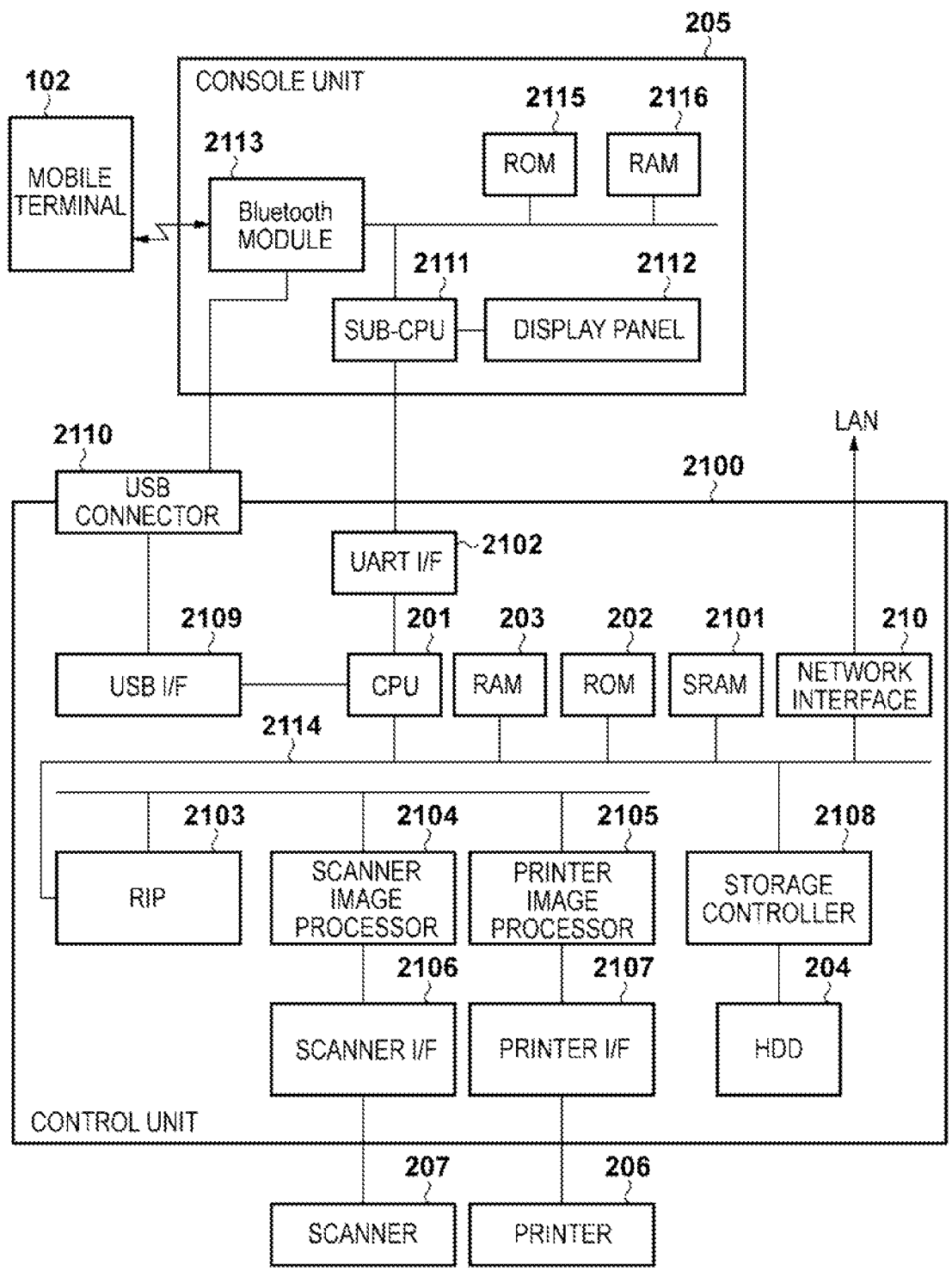

[Fig. 22A]
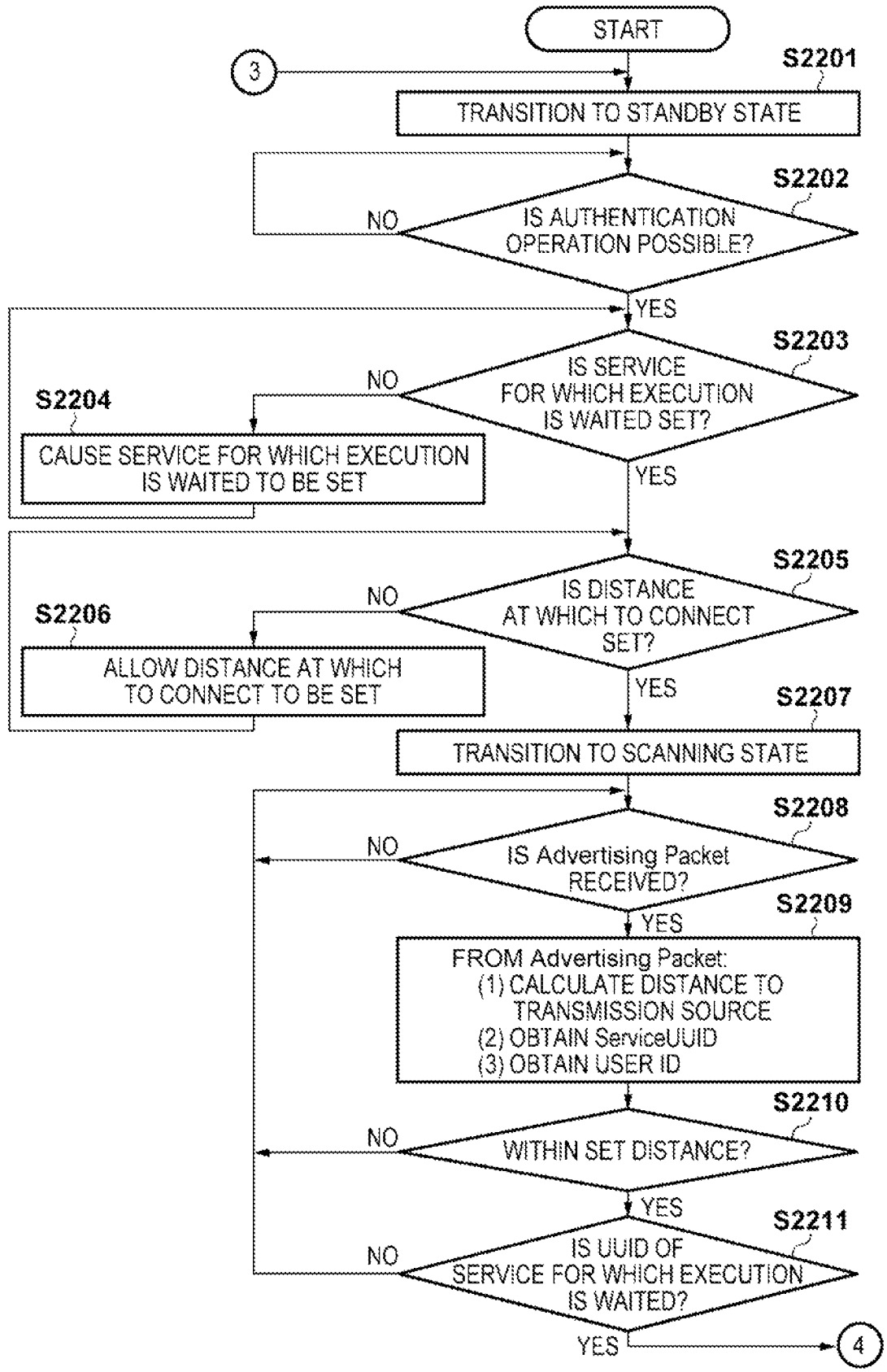

[Fig. 22B]
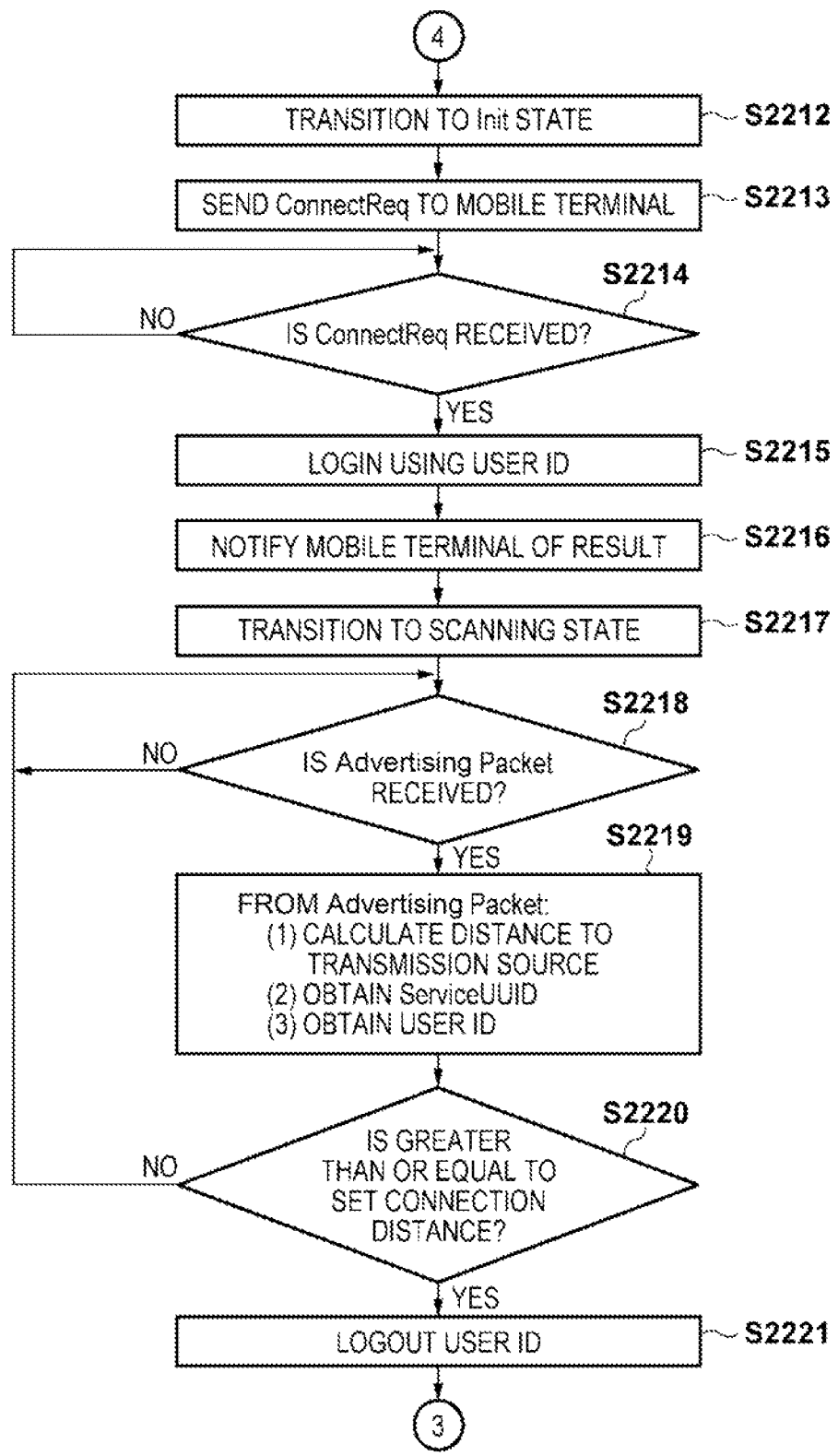

[Fig. 23]
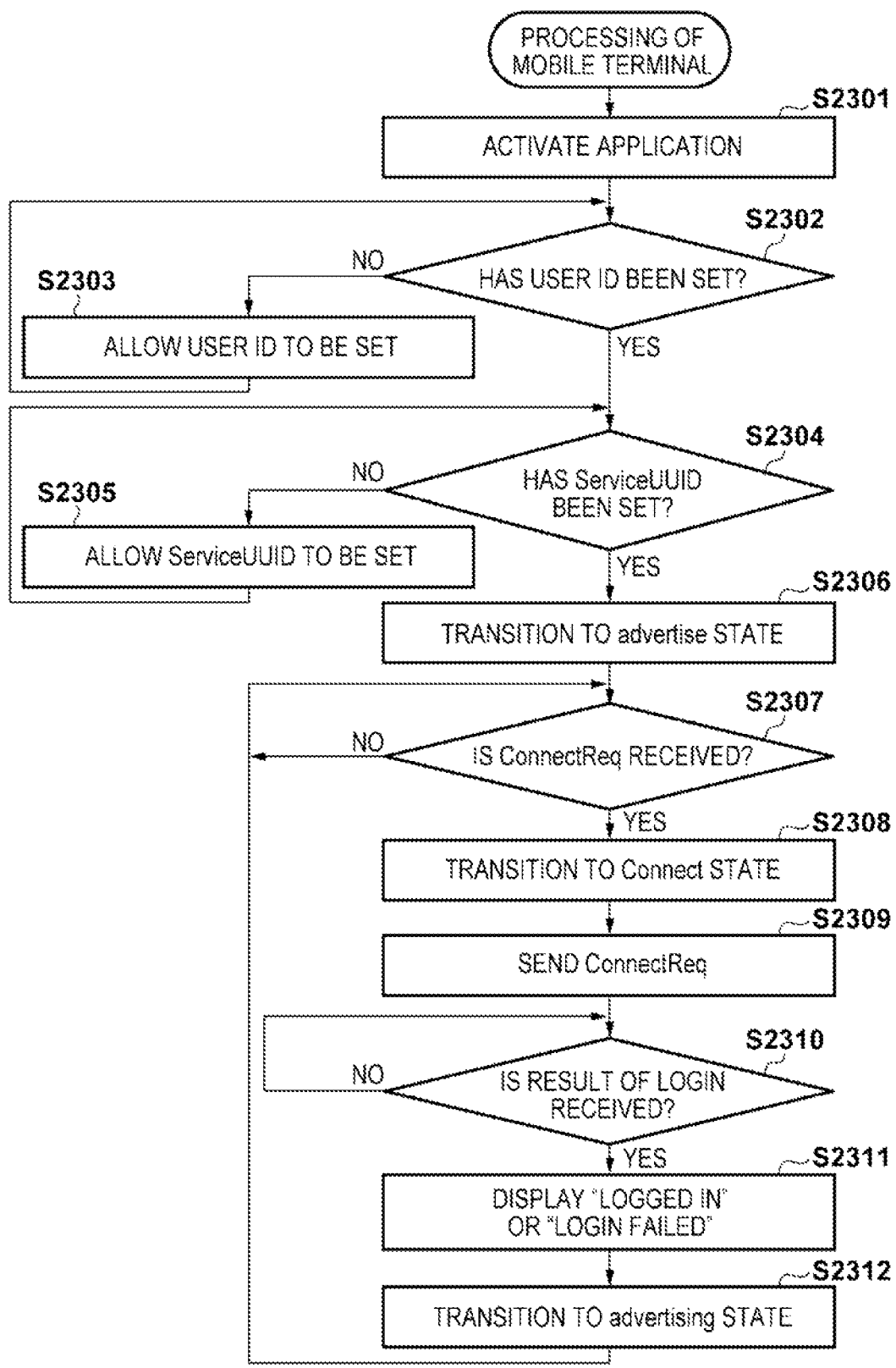

COMMUNICATION SYSTEM, MOBILE TERMINAL, METHOD OF CONTROLLING THE MOBILE TERMINAL, AND STORAGE MEDIUM

TECHNICAL FIELD

The present invention relates to a communication system, a mobile terminal, a method of controlling the same, and a storage medium.

BACKGROUND ART

When logging into a conventional multi-function peripheral, a user logs in after authenticating by causing the user's IC card to be read into a card reader connected to the multi-function peripheral (refer to, for example, Japanese Patent Laid-Open No. 2011-227760).

When using a conventional IC card to log in, effort to hold up the IC card to the card reader occurs. In addition, after holding up the IC card to the card reader, there are cases in which it takes time until the authentication of the user completes, and thus it takes time until the user logs in.

SUMMARY OF INVENTION

An aspect of the present invention is to eliminate the above-mentioned problems with the conventional techniques.

A feature of the present invention is the provision of a technique with which it is possible for a user to receive a service of an information processing apparatus simply by the user holding a mobile terminal and approaching the information processing apparatus, and which reduces a waiting time required for authentication of the user to improve convenience for the user.

According to a first aspect of the present invention, there is provided a communication system including an information processing apparatus and a mobile terminal, wherein the information processing apparatus comprising:
first transmission means for transmitting a packet; and
processing means for executing login processing, and
wherein the mobile terminal comprising:
reception means for receiving the packet;
first determination means for determining, in a case where the reception means receives the packet, whether or not a login condition for transmitting a login request is satisfied based on a received signal strength of the packet; and
second transmission means for transmitting the login request to the information processing apparatus in a case where it is determined by the first determination means that the login condition is satisfied, and not transmitting the login request to the information processing apparatus in a case where it is determined by the first determination means that the login condition is not satisfied.

According to a second aspect of the present invention, there is provided a mobile terminal capable of transmitting a login request to an information processing apparatus, the mobile terminal comprising:
reception means for receiving a packet that the information processing apparatus transmits;
first determination means for determining, in a case where the reception means receives the packet, whether or not a login condition for transmitting a login request is satisfied based on a received signal strength of the packet; and
transmission means for transmitting the login request to the information processing apparatus in a case where it is determined by the first determination means that the login condition is satisfied, and not transmitting the login request to the information processing apparatus in a case where it is determined by the first determination means that the login condition is not satisfied.

According to a third aspect of the present invention, there is provided a method of controlling a mobile terminal that receives a packet transmitted from an information processing apparatus, the method comprising:
a first determination step of determining, in a case where the mobile terminal receives the packet, whether or not a login condition for transmitting a login request is satisfied based on a received signal strength of the packet; and
a first control step of controlling the mobile terminal so as to transmit the login request to the information processing apparatus in a case where it is determined in the first determination step that the login condition is satisfied,
wherein the mobile terminal is controlled so as to not transmit the login request to the information processing apparatus in a case where it is determined in the first determination step that the login condition is not satisfied.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1 depicts a view for illustrating an example configuration of a communication system according to a first embodiment of the present invention.

FIG. 2 is a block diagram for explaining a hardware configuration of a mobile terminal and an MFP according to the first embodiment.

FIG. 3A is a block diagram for explaining a software configuration of the MFP according to the first embodiment.

FIG. 3B is a block diagram for explaining a software configuration of the mobile terminal according to the first embodiment.

FIG. 4 depicts a view explaining screen transitions in accordance with login and logout, and an example of a screen that is displayed on a console unit of the MFP according to the first embodiment.

FIG. 5 depicts a view for describing an example of a Bluetooth service provided by the MFP according to the first embodiment.

FIG. 6 is a flowchart for describing basic operation of the mobile terminal according to the first embodiment.

FIG. 7 is a flowchart for describing details of MFP usage processing of step S608 of FIG. 6.

FIG. 8 depicts a view showing a UI of the mobile terminal that presents a substitution function to a user.

FIG. 9 is a flowchart for describing details of processing for using a substitution function of step S710 of FIG. 7.

FIG. 10 is a flowchart for describing details of MFP usage termination processing of step S611 of FIG. 6.

FIG. 11 is a flowchart for describing operation of local login processing in the MFP according to the first embodiment.

FIG. 12 is a flowchart for describing operation of logout processing in the MFP according to the first embodiment.

FIG. 13 is a flowchart for describing operation in a case in which the MFP has received a login request from the mobile terminal.

FIG. 14A depicts a view explaining example states of the mobile terminal and the MFP according to the first embodiment of the present invention.

FIG. 14B depicts a view explaining example states of the mobile terminal and the MFP according to the first embodiment of the present invention.

FIG. 14C depicts a view explaining example states of the mobile terminal and the MFP according to the first embodiment of the present invention.

FIG. 14D depicts a view explaining example states of the mobile terminal and the MFP according to the first embodiment of the present invention.

FIG. 15 depicts a view for describing characteristic and a user authentication service according to Bluetooth, provided by the MFP according to a second embodiment of the present invention.

FIG. 16 depicts a view for describing a sequence for when the mobile terminal performs a login request to the MFP according to the second embodiment.

FIG. 17 is a flowchart for describing manual logout processing by the MFP according to a third embodiment.

FIG. 18A depicts a view for describing characteristics provided by a user authentication service of the MFP according to a fourth embodiment of the present invention.

FIG. 18B depicts a view for describing characteristics provided by a user authentication service of the MFP according to the fourth embodiment of the present invention.

FIG. 19 is a flowchart for describing detail of processing of step S608 of FIG. 6 in the fourth embodiment.

FIG. 20A is a flowchart for describing operation of local login processing in the MFP according to the fourth embodiment.

FIG. 20B is a flowchart for describing operation of local login processing in the MFP according to the fourth embodiment.

FIG. 21 is a block diagram for explaining a hardware configuration of the MFP according to a fifth embodiment of the present invention.

FIG. 22A is a flowchart for describing processing from allowing a user of the mobile terminal to login upon a signal from the mobile terminal to the MFP, until logout according to the fifth embodiment.

FIG. 22B is a flowchart for describing processing from allowing a user of the mobile terminal to login upon a signal from the mobile terminal to the MFP, until logout according to the fifth embodiment.

FIG. 23 is a flowchart for describing processing by which the mobile terminal logs into the MFP according to the fifth embodiment.

DESCRIPTION OF EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that embodiments explained below explain an example of a multi function peripheral (MFP) as one example of an information processing apparatus according to the present invention. However, the information processing apparatus according to the present invention is not limited to such a multi-function peripheral, and it can be adapted to, for example, a communication apparatus, such as a printer, scanner, a lax machine or the like; an information device, such as a PC; or the like.

First Embodiment

FIG. 1 depicts a view for illustrating an example configuration of a communication system according to a first embodiment of the present invention.

In this communication system, a plurality of MFPs (multi-function peripheral) and a plurality of mobile terminals are present, and, for example, an office environment in which each user possesses his or her own mobile terminal and always carries it is envisioned. Each MFP has a copy function, facsimile transmission/reception function, scanning function, box function, transmission function, printing function, or the like, and is installed in accordance with the office environment. The system of FIG. 1 shows an MFP 101, a mobile terminal 102, and a mobile terminal 103, but the number of these devices is not limited to this.

The mobile terminal 102 and the mobile terminal 103 are each possessed by different users. The MFP 101 is connected to a network (LAN) 104, and can perform bidirectional communication with other terminals connected to the LAN 104, via the IAN 104. Similarly, the mobile terminal 102 and the mobile terminal 103 can be connected to the LAN 104 via a wireless router 105, and can perform bidirectional wireless communication with other terminals connected to the LAN 104. In addition, the MFP 101 and the mobile terminals 102, 103 comprise a Bluetooth (registered trademark) communication function as a short-range wireless communication function, and in a range in which Bluetooth radio waves reach cart perform communication, after connecting to one another.

FIG. 2 is a block diagram for explaining a hardware configuration of the MFP 101 and the mobile terminal 102 according to the first embodiment. Note that because a hardware configuration of the mobile terminal 103 is the same as the mobile terminal 102, an explanation thereof is omitted.

Firstly, a hardware configuration of the MFP 101 is explained.

A CPU 201 controls operation of the MFP 101 overall. The CPU 201 reads a control program stored in a ROM 202, and then performs various control, such as reading control, print control, or transmission control. A RAM 203 is a volatile memory used as a work area or the like when the CPU 201 executes various programs. An HDD (hard disk drive) 204 stores image data or various programs. A console unit 205 comprises a display unit that operates as a touch panel that is operable with a users finger, hard keys, or the like. A printer 206 prints an image on a sheet in accordance with image data transferred via an internal bus 221. A scanner 207 generates image data after reading an image on an original. An IC card reader 208 reads an IC card, which the user possesses, for authentication of the user. A Bluetooth I/F 209 is an interface that performs wireless communication in accordance with a Bluetooth standard, and performs both-way wireless communication with another device that has a Bluetooth I/F. In the first embodiment, the MFP 101 can perform both-way communication in accordance with the Bluetooth standard with the mobile terminals 102, 103. A network I/F 210 has an NIC (Network Interface Card) for connecting to the LAN 104. A timer 223 performs timekeeping for a predetermined amount of time in accordance with an instruction of the CPU 20L and notifies the CPU 201 by an interrupt or the like when a designated interval has elapsed. The internal bus 221 is connected to the CPU 201 and each unit described above, and conveys data, a control signal, or the like. Note that a program executed by the CPU 201 may be installed in the HDD 204, and may be executed after being deployed into the RAM 203 at execution time.

Next, a hardware configuration of the mobile terminal 102 is explained.

A CPU 211 controls operation of the mobile terminal 102 overall. A RAM 212 is a volatile memory used as a work area or the like when the CPU 211 executes various programs. A flash memory 213 is a non-volatile memory that stores various programs or data. A console unit 214 comprises a display unit and that operates as a touch panel that is operable with a user's finger. A Bluetooth I/F 215 is an interlace that communicates by Bluetooth, and performs both-way communication with another device that has a Bluetooth interface. In the first embodiment, the mobile terminal 102 performs both-way communication with the MFP 101 via Bluetooth. A wireless network interface 216 is a wireless-supporting NIC capable of communicating after connecting to the wireless router 105. A speaker 217 converts an electrical signal into a sound. A microphone 218 detects a sound and converts it into an electrical signal. A camera 219 captures a still image or a moving image, and converts it into electronic data. A GPS 220 is a receiver for Global Positioning System. An internal bus 222 is connected to the CPU 211 and each unit described above, and conveys data, a control signal, or the like.

FIG. 3A is a block diagram explaining a software configuration of the MFP 101 according to the first embodiment, and FIG. 3B is a block diagram explaining a software configuration of the mobile terminal 102 according to the first embodiment. Note that because a software configuration of the mobile terminal 103 is the same as the mobile terminal 102, an explanation thereof is omitted.

FIG. 3A is a block diagram for describing a software configuration of the MFP 101, and a data region that software manages. A document 304, a print job 305, a counter 306, and a user account 313 indicate data regions that software stores in the RAM 203 or the HDD 204 and manages. A platform 301 can be configured in a form that includes an operating system such as Linux (registered trademark), a Java (registered trademark) virtual machine, an OSGi (registered trademark) framework, and a device driver group. Java is a registered trademark of Oracle Corporation. An OSGi framework is a Java-based service platform defined by the OSGi Alliance (a standardization organization). The platform 301 comprises a device driver group for controlling various hardware thereby providing applications that operate on the platform 301 with an API for using hardware. For example, a Bluetooth controller 302 is a device driver for controlling the Bluetooth I/F 209, and a network controller 303 is a device driver for controlling the network I/F 210. Others are not shown graphically, but a printer module that controls the printer 206 and a scanner module that controls the scanner 207 are present in this platform 301. The platform 301 provides applications with an API for reading/writing data of the document 304, the print job 305 and the counter 306.

A menu 307, a copy 308, a print 309, and a send 310 are applications that operate on the platform 301, and display user interfaces that provides various functions to the console unit 205. For example, the copy 308 controls the scanner 207 and the printer 206 via the platform 301, to execute a copy. The print 309 provides a function that prints document data stored in the document 304 or a print job saved in the print job 305. Output of copying or printing is executed via an API of the platform 301, and the platform 301 records in the counter 306 the number of sheet printed. The send 310 provides a function that transmits document data obtained from the scanner 207 to an external unit. The menu 307 is a module that displays a menu screen for selecting an application (for example, copy, print, send) from the console unit 205. A remote UI 311 is a module that provides a user interlace described in HTML when a Web browser of the mobile terminal 102 or 103 accesses the MFP 101 via an HTTP protocol. The remote UI 311 provides a user interface that manages setting of the MFP 101, and a user interface for printing document data stored in the document 304. A login service 312 is a module that provides a login function when a user uses the MFP 101.

Next, explanation will be given of a management function for the user account 313 which the login service 312 comprises, a local login function, a remote login function, and a Bluetooth service access login function.

User Account Management Function

A user interface for performing registration or management of a user account is provided to a user. Information registered via the user interface is recorded in the user account 313 and then managed. For this information that is managed, there is, for example, a user name/a password/an IC card number/a role/or the like, as shown in TABLE 1 (list of user information).

TABLE 1

LIST OF USER INFORMATION

| USER NAME | PASSWORD | IC CARD NUMBER | ROLE |
|---|---|---|---|
| ALICE | PASSWORD1 | 01A1B2C3D4E5F6G1 | ADMINISTRATOR |
| BOB | PASSWORD2 | 01A1B2C3D4E5F6G2 | GENERAL USER |
| CAROL | PASSWORD3 | 01A1B2C3D4E5F6G3 | GENERAL USER |
| DAVE | PASSWORD4 | 01A1B2C3D4E5F6G4 | GENERAL USER |

Local Login Function

A login/logout function is provided to a user who uses the console unit 205. A login screen is displayed on the console unit 205, guarding such that a user who has not logged-in cannot, use the console unit 205. The number of users who can be simultaneously be logged in locally is "1". Accordingly, a plurality of users cannot simultaneously be logged in locally. If login for a user has succeeded, the screen of the display unit of the console unit 205 is caused to transition from a login screen to a menu screen, to cause the state to be such that the user can use the MFP 101. As methods of performing the local login, a plurality of login methods are provided. For example, the following login methods are provided.

(1) Login Using Keyboard

Via the login screen displayed by the console unit 205, a user name and a password input by the user operating the console unit 205 are obtained, and login processing is performed when that user is authenticated.

(2) Login using IC Card

An IC card number is obtained from a user's IC card that is held up to the IC card reader 208, the user is specified, and login processing is performed when the user can be authenticated.

(3) Login Using Mobile

When user authentication information and a login request are received from a mobile terminal via a Bluetooth communication, the user is authenticated and login processing is performed. Here a level is provided for the login request by the mobile terminal, and for example, an implementation is made so that a request of a predetermined level is refused depending on the state of the MFP 101. The MFP 101 records and manages a StatusID, shown in TABLE 2 below (list of login permission/prohibition states), in the RAM 203. Here, as shown in TABLE 2, if StatusID is "1" login is possible, but if StatusID is "2" or "3", there are cases in which a login request is not accepted, depending on the login request level and a state of the MFP 101. When StatusID is "3", configuration is taken such that, after the user logs out, a login request from the user is not accepted until the user exits a range of a predetermined distance (for example, 10 cm to 2 m) from the MFP 101.

TABLE 2

LIST OF LOGIN PERMISSION/PROHIBITION STATES

| StatusID | MEANING |
|---|---|
| 1 | LOGIN IS POSSIBLE |
| 2 | LOGIN REQUEST LEVEL 1 IS NOT ACCEPTED BECAUSE ANOTHER USER IS LOGGED IN. |
| 3 | LOGIN REQUEST LEVELS 1 AND 2 ARE NOT ACCEPTED BECAUSE IMMEDIATELY AFTER A LOGOUT |

Next, as methods of logging-out after the local login, the following plurality of methods are provided.

(1) A logout button 410 (FIG. 4) is displayed on the console unit 205, and logout processing is performed when a press of the logout button is detected.

(2) Logout processing is performed when the user does not operate the console unit 205 for a predetermined interval.

(3) Logout processing is performed when a logout request is received from a mobile terminal.

After logout processing, the login screen is displayed.

Next, explanation will be given regarding a remote login.

Remote Login Function

A login/logout function is provided when using the remote UI 311. For example, when access to the remote UI 311 from the mobile terminal 102 is detected, information of a login screen described in HTML is transmitted to the mobile terminal 102. The user name and password input to the login screen are then obtained, user authentication is performed, and login to the remote UI 311 is permitted. Configuration is taken such that a plurality of users can remote login simultaneously.

(1) Login Function for Bluetooth Service Access

A login/logout function is provided for accessing services exposed by Bluetooth.

Next, referring to FIG. 3B, explanation is given of a software configuration of the mobile terminal 102 according to the first embodiment. Note that in the following explanation, explanation is given of an example of the mobile terminal 102, but in the ease of the mobile terminal 103, of course it is possible to execute similarly.

A document 320 and authentication information 319 indicate data regions that software stores and manages in the Hash memory 213. A platform 314 can be configured from a platform such as, for example, Google Inc.'s Android (registered trademark) or Apple Inc.'s iOS (registered trademark). The platform 314 comprises a device driver group for controlling various hardware thereby providing applications that operate on the platform 314 with an API for using the various hardware. As a device driver group, in the first embodiment, a Bluetooth controller 315 and a wireless network controller 316 are present. The Bluetooth controller 315 is a device driver for controlling the Bluetooth I/F 215, and the wireless network controller 316 is a device driver for controlling the wireless network interface 216. It is possible to install various applications on the mobile terminal 102, and to cause the applications to operate on the platform 314. In the first embodiment, an MFP connection application 317 is installed in advance. The MFP connection application 317 is, for example, provided with functions as below.

(1) Connecting to the MFP 101 via Bluetooth, and performing the login request or the logout request.

(2) It is possible for a user to record in advance, in the authentication information 319, user authentication information (user name, password) used for the login request. For example, a pair of a user name and a password shown in the following TABLE 3 (Authentication information) is recorded.

TABLE 3

AUTHENTICATION INFORMATION

| ITEM | VALUE |
|---|---|
| USER NAME | ALICE |
| PASSWORD | PASSWORD1 |

(3) A connection is made to the MFP 101 via the wireless LAN, and a print request for document data or photograph data recorded in the document 320 is issued.

(4) A Web browser 318 is activated and connection with the remote UI 311 of the MFP 101 is made.

The MFP connection application 317, for example, holds installation values such as are shown in TABLE 4 (List of connection settings) below. The following TABLE 4 indicates that the login request is performed when the mobile terminal 102 enters a distance not more than 2 m from the MFP 101, and indicates that the logout request is performed when the mobile terminal 102 is a distance of 5 m or more apart from the MFP 101. This means that the level of the login request is used differently in accordance with a distance between the MFP 101 and the mobile terminal 102. Note that, as will be explained later, the distance at which the request is performed may be set to different values depending on the user. For example, for a user who always works near the MFP 101, the distance at which this request is performed is set to be smaller than for other users.

TABLE 4

LIST OF CONNECTION SETTINGS

| DISTANCE AT WHICH A REQUEST IS PERFORMED | REQUEST TO MFP |
|---|---|
| 2 m TO 30 cm | LOGIN REQUEST LEVEL 1 |
| 30 cm TO 10 cm | LOGIN REQUEST LEVEL 2 |
| 10 cm OR LESS | LOGIN REQUEST LEVEL 3 |
| 5 m OR MORE | LOGOUT REQUEST |

Configuration may be taken so that the above distances can be modified by a user of the mobile terminal 102, or configuration may be taken so as to obtain settings of the above distances from the MFP 101. Measurement of a distance from the MFP 101 uses an RSSI (Received Signal Strength Indication) of Bluetooth that the MFP 101 transmits. It is advantageous if a logout distance is longer than a login distance. This is because the RSSI weakens if an obstacle enters between the mobile terminal 102 and the MFP 101, and a logout due to a misdetection due to an obstacle being in between is prevented. For example, using the property that the RSSI attenuates when distance between the MFP 101 and the mobile terminal 102 lengthens, it is possible to create data showing a relation between the RSSI (dBm) and the distance from the MFP 101, as in data shown on the following TABLE 5 (List of RSSI and estimated distance).

TABLE 5

LIST OF RSSI AND ESTIMATED DISTANCE

| RSSI (dBm) | −40 | −50 | −59 | −62 |
|---|---|---|---|---|
| ESTIMATED DISTANCE | 10 cm | 50 cm | 1 m | 2 m |

If an intensity of a Bluetooth transmission radio wave that the MFP 101 transmits is known in advance, configuration may be taken so as the mobile terminal 102 holds in advance data of the relation between RSSI and the distance from the MFP 101, such as is described above. Configuration may also be taken such that the mobile terminal 102 dynamically calculates the distance from the MFP 101 by obtaining from the MFP 101 information regarding the intensity of the Bluetooth transmission radio wave that the MFP 101 transmits, and comparing this information with the RSSI.

FIG. 4 depicts a view for explaining screen transitions in accordance with login and logout, and an example of a screen that is displayed on a console unit 205 of the MFP 101 according to the first embodiment.

For example, in a state before the user login, a login screen 401 is displayed on the console unit 205, and reception of the login request via Bluetooth from the mobile terminal 102 or detection of the IC card is waited for. The login processing is performed when detection of the IC card, or the login request by Bluetooth is received. If the login succeeds, transition is made to a menu screen 403, and if the login fails, the original login screen 401 is displayed. If a press of a button 404 that switches to keyboard authentication is detected on the login screen 401, transition is made to a login screen 402 that uses a software keyboard for account and password input. The login screen 402 is provided with a button 405 for returning to the login screen 401. When a press of a login button 406 is detected on the login screen 402, the account and password input via the login screen 402 are obtained, and login processing that includes authentication processing of the user is performed, if the login succeeds, transition is made to the menu screen 403, and if the login fails, the original login screen 402 is displayed.

The menu screen 403 is provided with buttons 407 to 409 for calling various applications, and the logout button 410. If a press of the logout button 410 is detected, logout processing is executed, and then the login screen 401 is displayed.

Next, explanation will be given of Bluetooth functions and services provided by the MFP 101 according to the first embodiment.

For the MFP 101 according to the first embodiment, when a power supply is turned on, the platform 301 activates Bluetooth via the Bluetooth controller 302, and sends a Bluetooth Advertising Packet at predetermined intervals. This Advertising Packet includes data such as below.

Local Name

A device name, or the like. For example, "(company name) MFP CXXX" or the like.

Manufacturer Specific Data

An identifier and optional data of a maker that manufactured the MFP is stored, it is possible to include an RSSI (Received Signal Strength Indication, for example, −59 dBm) for a case in which a Bluetooth packet is received at a location separated from the device by 1 m.

TX Power Level

Transmission radio wave intensity. For example, "−38 dBm" or the like.

Service UUIDs

A UUID representing a function of the device.

FIG. 5 depicts a view for describing an example of a Bluetooth service provided by the MFP 101 according to the first embodiment.

This MFP 101 exposes to the mobile terminal 102 connected via Bluetooth a maintenance service 504, a print service 503, an MFP information service 502 and a user authentication service 501 defined by a GATT (Generic Attribute) profile. The user authentication service 501 comprises the following characteristics that are defined by the GATT profile. The login service 312 performs reading/writing of a value for each characteristic via an API provided by the platform 301 and the Bluetooth controller 302.

StatusID 505

A characteristic indicating a state relating to login permission/prohibition of the MFP 101. Read by the mobile terminal 102, and used to obtain the state regarding login permission/prohibition of the MFP 101. As this value, similarly to in the list of login permission/prohibition states, values shown in the following TABLE 6 (list of StatusIDs) are stored.

TABLE 6

StatusID LIST

| StatusID | MEANING |
|---|---|
| 1 | LOGIN IS POSSIBLE |
| 2 | LOGIN REQUEST LEVEL 1 IS NOT ACCEPTED BECAUSE ANOTHER USER IS LOGGED IN. |
| 3 | LOGIN REQUEST LEVELS 1 AND 2 ARE NOT ACCEPTED BECAUSE IMMEDIATELY AFTER A LOGOUT |

The login service 312 changes the value (StatusID) in accordance with a change of the state. At a time of changing the value, the Bluetooth controller 302 notifies the connected mobile terminal 102 of the change of the value, via a Notification in an Attribute Protocol (ATT).

UserName 506

A characteristic for writing (Write) the user name when the mobile terminal 102 requests login.

Password 507

A characteristic for performing a Write of the password when the mobile terminal 102 requests login. May be configured as a characteristic for which encryption is necessary for the password for which a Write is performed.

RequestID 508

A characteristic for the mobile terminal 102 to perform a Write of a request for an authentication service. For example, Write is performed for the RequestID 508 such as is shown in the following TABLE 7 (RequestID list). Note that the login request levels shown in TABLE 7 correspond to the login request levels shown in the previously described TABLE 4.

TABLE 7

RequestID LIST

| RequestID | MEANING |
|---|---|
| 1 | LOGIN REQUEST LEVEL 1 |
| 2 | LOGIN REQUEST LEVEL 2 |
| 3 | LOGIN REQUEST LEVEL 3 |
| 4 | LOGOUT REQUEST |
| 5 | LOGIN REQUEST FOR BLUETOOTH SERVICE ACCESS |

ResultID 509

A characteristic that stores an authentication result (success/failure of user authentication) of when the MFP 101 receives the login request from the mobile terminal 102 and performs authentication of the user. For example, values as shown in the below TABLE 8 (ResultID list) are stored.

TABLE 8

RequestID LIST

| RequestID | MEANING |
|---|---|
| 1 | LOGIN SUCCESS |
| 2 | LOGIN FAILURE |
| 3 | CANCEL |
| 4 | OTHER ERROR |

At a time of storing an authentication result, the Bluetooth controller 302 notifies the connected mobile terminal 102 of the authentication result, via a Notification in an Attribute Protocol (ATT).

The MFP information service 502 is provided with a URL 510 that stores a URL of the remote UI 311 in the characteristic. Setting of the value of the URL 510 is performed by the platform 301 at a time of activating the MFP 101.

The print service 503 is configured as a service that is searchable from the mobile terminal 102 after success of a login for access to services via Bluetooth. The print service 503 comprises characteristics as shown below. The print 309 performs reading/writing of a value for each characteristic via art API provided by the platform 301 and the Bluetooth controller 302.

MyJobList 511

Stores an identifier of a print job associated with a user who performed login for Bluetooth service access, from print jobs temporarily stored in the print job 305. If there are a plurality of print jobs associated with that user, stores identifiers of the plurality of print jobs.

RequestID 512

A characteristic for the mobile terminal 102 to request an operation with respect to the print job 305. For example, a Write can be performed for IDs shown in the following TABLE 9 (print service RequestID list). A value for which a Write is performed by the mobile terminal 102 is communicated to the print 309, and the print 309 performs a prim job operation in accordance with the request. Here, it is possible to instruct printing or deletion of the prim job.

TABLE 9

PRINT SERVICE RequestID LIST

| RequestID | MEANING |
|---|---|
| 1 | PRINT JOB DESIGNATED BY RequestParameter |
| 2 | DELETE JOB DESIGNATED BY RequestParameter |

RequestParameter 513

A characteristic that stores an identifier of the print job 305 that is to be target of an operation when the mobile terminal 102 requests the operation with respect to the print job 305. The mobile terminal 102 writes the identifier of the print job obtained from the MyJobList 511.

The maintenance service 504 is configured as service searchable from the mobile terminal 102 when a login for accessing services via Bluetooth is successful and a role of the user who logged in is an administrator. The maintenance service 504 is provided with a Count 514 that stores a count of the counter 306 for a characteristic. For a value of the Count 514, the platform 301 detects a change of the value of the counter 306, and sets the same value.

Note that, while not shown graphically, each service and characteristic is provided with information, such as a handle or UUID, a type information of data, text information, or the like.

Next, explanation is given of basic operation in the mobile terminal 102 according to the first embodiment.

FIG. 6 is a flowchart for describing basic operation of the mobile terminal 102 according to the first embodiment. Below, referring to FIG. 6, explanation is given for basic operation when a user who has the mobile terminal 102 approaches the MFP 101, and the starts usage of the MFP 101. Inasmuch as it is not mentioned in particular, a subject of operation of the mobile terminal 102 is the CPU 211. Inasmuch as it is not mentioned in particular, a software subject is the MFP connection application 317, or, when the MFP connection application 317 calls an API provided by the platform 314, the platform 314 performs processing in its place. Here, explanation is given with the CPU 211 as the subject of operation.

When processing of the mobile terminal 102 is started, in step S601 the CPU 211 starts a scan for a Bluetooth Advertising Packet transmitted from the MFP 101. Then in step S602, upon receiving the Advertising Packet, the CPU 211 advances the processing to step S603, and the CPU 211 determines whether a transmission source of the Advertising Packet is a predetermined MFP. Here, the MFP that the user of the mobile terminal 102 normally uses is registered in advance in the mobile terminal 102. Accordingly, in step S603 the CPU 211 determines whether or not the transmission source of the received Advertising Packet is this registered MFP. More specifically, the CPU 211 analyzes the received Advertising Packet, refers to a value of LocalName, Manufacturer Specific Data, or Service UUIDs, and if a known value is stored, the CPU 211 determines that the received Advertising Packet is of a predetermined MFP. In step S603, if it is not determined to be a predetermined MFP, the Advertising Packet is ignored and the processing proceeds to step S602. Note that the reason to perform the determination of step S603 is to prevent login to an MFP when the user simply has approached or passed by the side of the MFP but does not intend to use it.

In step S603, if it is determined to be an Advertising Packet from the predetermined MFP 101, the processing proceeds to step S604, and the CPU 211 calculates the distance between the MFP 101 and the mobile terminal 102 from the RSSI (refer to TABLE 5). Here, for example, the distance is calculated from a difference between the RSSI and information relating to an intensity of a transmission radio wave transmitted by the MFP 101, which is included in Manufacturer Specific Data or TX Power Level of the Advertising Packet. Note that because RSSI includes errors, configuration may also be taken such that calculation of the distance is calculated after sampling a plurality of Advertising Packets.

Next the processing proceeds to step S605, and the CPU 211 refers to the distance calculated in step S604 and settings shown on a table of a list of connection settings (TABLE 4), to determine whether or not it is within a predetermined distance at which to start usage of the MFP 101. In the first embodiment, it is within the predetermined distance when it is, for example, within a distance of 2 m. Note that at this point, different distances may be set in accordance with the user. Here, for example if a user A mostly works near the MFP 101, when a distance at which the user A can log in is set to within 2 m, because this would mean that the user A would always be logged in, in such a case the distance corresponding to the user A is for example set to 30 cm or the like. If in step S605 the CPU 211 determines that it is within the predetermined distance, the processing proceeds to step S606, and whether the MFP 101 is in use is determined. As a determination method for this, for example, a usage status flag of the MFP that indicates whether the MFP is in use as shown in the following TABLE 10 (usage status flag of the MFP) is recorded in the RAM 212 and used. If the MFP 101 is in use, that usage status flag is set to TRUE, and when the use completes, that flag is set to FALSE; the mobile terminal 102 manages the usage status of the MFP 101.

TABLE 10

USAGE STATUS FLAG OF MFP

| VALUE | MEANING |
|---|---|
| TRUE | MFP IS BEING USED |
| FALSE | MFP IS NOT BEING USED |

Here, management of the usage status of the MFP 101 is to avoid inputting another job when the MFP 101 is executing a job. If the MFP usage status flag indicates not being in use, the processing proceeds to step S607, the CPU 211 changes that flag to TRUE, which indicates that it is in use, the processing proceeds to step S608, and processing that uses the MFP 101 is executed. Meanwhile, in step S606 when the MFP usage status flag indicates in use, processing completes as is.

Meanwhile, in step S605, if the CPU 211 determines that the distance to the MFP 101 is not within the predetermined distance, the processing proceeds to step S609, the CPU 211 refers to the setting shown on TABLE 4 of the list of connection settings, and determines whether distance to the MFP 101 is greater than or equal to a predetermined distance to end usage of the MFP 101. In the first embodiment, the predetermined distance or more is, for example, 5 m or more. If in step S609 the CPU 211 determines that it is the predetermined distance or more, the processing proceeds to step S610, and the CPU 211 determines whether or not the MFP 101 is in use referring to the previously described flag. Here, if it is determined that the MFP 101 is in use, the processing proceeds to step S611, and the CPU 211 performs processing for termination of usage of the MFP 101. Then the processing proceeds to step S612, the CPU 211 changes the previously described flag to FALSE, and this processing terminates. In addition, if in step S609 the CPU 211 determines the distance to the MFP 101 is not greater than or equal to the predetermined distance, the processing advances to step S602. In addition, if in step S610 it is determined that the MFP 101 is not in use, processing terminates as is.

Note that in step S601 there is no necessity for the MFP connection application 317 to be activated. For example, the MFP connection application 317 can request monitoring of whether the platform 314 has received an Advertising Packet from a predetermined MFP in advance. The platform 314, which has received the Advertising Packet from the predetermined the MFP, can also then activate the stopped MFP connection application 317.

In this way, by the mobile terminal 102 approaching a predetermined MFP, it is possible to transition that MFP to a state in which it can be used. Note that it is presumed that the mobile terminal 102 is something that the user always carries, and that a user does not forget to carry it, as with an IC card.

FIG. 7 is a flowchart for describing details of MFP usage processing of step S608 of FIG. 6.

When the mobile terminal 102 starts usage of the MFP 101, firstly in step S701 the CPU 211 establishes a communication connection with the MFP 101 via Bluetooth. Inasmuch it is not mentioned particularly, further data communication between the mobile terminal 102 and the MFP 101 is communication via Bluetooth. Next, the processing proceeds to step S702 and the CPU 211 obtains Bluetooth service information from the MFP 101, in the first embodiment, at this point in time it is possible to obtain information of services corresponding to the user authentication service 501 and the MFP 101. Next, the processing proceeds to step S703 and the CPU 211 reads the StatusID 505 that the user authentication service 501 is provided with. Then the processing proceeds to step S704, and the CPU 211 determines whether or not the login request to the MFP 101 is possible, based on a value obtained by reading the distance calculated in step S604 and the StatusID 505. Here, for example, if the calculated distance is 2 m to 30 cm, whether the login request to the MFP 101 at a login request level 1 is possible is determined based on the value obtained in accordance with the StatusID 505. As shown by TABLE 6 described previously, if the StatusID 505 is "1", the login request is possible, but if another value is indicated, it is determined that the login request is not possible. Similarly, if, for example, the calculated distance is 30 cm to 10 cm, permission/prohibition of the login request of a login request level 2 is determined based on a value obtained from the StatusID 505. In such a case, it is determined that the login request is possible if the StatusID 505 is "1" or "2", and the login request is not possible if the StatusID 505 is "3". Because the login request level is 3 if the calculated distance is less than or equal to 10 cm, it is determined that the login request is possible regardless of what value the StatusID 505 is.

If in step S704 the CPU 211 determines that the login request is possible, the processing proceeds to step S705, and a login to the MFP 101 is requested. More specifically, values are written to the RequestID 508, the Password 507, and the UserName 506 of the user authentication service 501. For example, information shown in the authentication information of TABLE 3 is written to the UserName 506 and the Password 507, and one of values "1", "2", or "3" shown in the RequestID list shown in previously described TABLE 7 is written to the RequestID 508, in accordance with the calculated distance. Next, the processing proceeds to step S706, and the CPU 211 receives by a Notification an update of the ResultID 509 and the StatusID 505 as a response from the MFP 101. Then the processing proceeds to step S707, and the CPU 211 disconnects the connection via Bluetooth with the MFP 101, and this processing terminates.

Meanwhile, if it is determined, in step S704, that the login request is not possible, the processing proceeds to step S708, and the CPU 211, for example, displays a screen such as is shown in FIG. 8 to the console unit 214, and thereby presents a function that can be used as a substitution function instead of the local login.

FIG. 8 depicts a view for showing an example of a screen that shows an example of a presentation of substitution functions when it is not possible to login to the MFP, and which is displayed on the console unit 214 of the mobile terminal 102 according to the first embodiment.

Here, a display to the effect that the MFP 101 cannot be used because another user is using the MFP 101, and a list of substitution functions are displayed. As instruction buttons for substitution functions, a "connect to remote UI" button 801, a "print" button 802, a "see maintenance information" button 803, and a "cancel" button 804 arc displayed.

Next the processing proceeds to step S709, and the CPU 211 determines whether or not the user has selected, through the screen of FIG. 8, a substitution function. Here, if the user did not select a substitution function but pressed the cancel button 804, the processing proceeds to step S707, the connection via Bluetooth with the MFP 101 is disconnected, and this processing terminates. However, if the user selected any substitution function, the processing proceeds to step S710, and the substitution function that the user selected is provided to the user. Then, when the processing by the function completes after the substitution function is provided, the processing proceeds to step S707, the connection via Bluetooth with the MFP 101 is disconnected, and this processing terminates.

FIG. 9 is a flowchart for describing details of processing for using the substitution function of step S710 of FIG. 7.

Firstly in step S901 the CPU 211 determines the substitution function that the user selected via the screen of FIG. 8, and executes processing corresponding to the selected substitution function. For example, if the user selected the "connect to remote UI" button 801, the processing proceeds to step S902. In step S902 the CPU 211 reads the URL 510 of the MFP information service 502, and obtains a URL of the remote UI 311 of the MFP 101. Next, the processing proceeds to step S903, and the CPU 211 activates the Web browser 318, and connects to the remote UI 311 of the MFP 101 via the wireless network interface 216. Then the processing proceeds to step S904, and the CPU 211 uses the HTTP protocol to execute remote login.

Meanwhile in step S901, if the user selected the "print" button 802, the processing proceeds to step S905, and the CPU 211 performs a login request for accessing services via Bluetooth to the MFP 101. More specifically, values are written to each of the RequestID 508, the Password 507, and the UserName 506 of the user authentication service 501. Here, the UserName 506 and the Password 507 are written with the authentication information of the user of the mobile terminal 102 as shown in TABLE 3. In addition, to the RequestID 508 is written a value "5" that indicates a login request for Bluetooth service access of TABLE 7. Next, the processing proceeds to step S906, and the CPU 211 receives by a Notification an update of the ResultID 509 as an authentication result from the MFP 101. Here, if login via Bluetooth succeeds, in step S906, the CPU 211 obtains service information, and the processing proceeds to step S907.

In the first embodiment, after logging in via Bluetooth, access to the print service is permitted by the MFP 101, and information of the print service can be obtained. Thus, the CPU 211 of the mobile terminal 102, which has obtained information of the print service, can use the print service in step S907. For example, it is possible to obtain information of a job associated with the authenticated user from the print service. Also, it is possible to display jobs of the user on the console unit 214, and accept a print instruction from the user, for example. If the user instructs printing, a print request is written to the RequestID 508, and an instruction to print is made to the MFP 101.

Also, if, in step S901, the user selected the "see maintenance information" button 803, for example, the processing proceeds to step S908, and the CPU 211 makes a login request for accessing services via Bluetooth to the MFP 101. Next, the processing proceeds to step S909 and the CPU 211 obtains the service information, in the first embodiment, if a role of a user who succeeded in login via Bluetooth and was authenticated is an administrator, die user is permitted by the MFP 101 to access the maintenance service, and it becomes possible to obtain the maintenance service. Thus if access to the maintenance service succeeds, the processing proceeds to step S910, and the CPU 211 uses the maintenance service. Here, for example, it is possible to obtain information of the counter 306 from the maintenance service, and display the value of the counter on the console unit 214.

FIG. 10 is a flowchart for describing details of the MFP 101 usage termination processing of step S611 of FIG. 6.

Firstly, in step S1001 when the CPU 211 starts logout processing, the CPU 211 performs a Bluetooth connection to the MFP 101. Next, the process proceeds to step S1002, and the CPU 211 obtains the service information, and obtains information of the user authentication service 501. Next, processing proceeds to step S1003, and the CPU 211 reads a value of the StatusID 505. Next, processing proceeds to step S1004, and the CPU 211 determines whether or not it is locally logged in to the MFP 101, based on the value of the StatusID 505. In the first embodiment, from the StatusID 505 list of TABLE 6, if the StatusID 505 is "2", this indicates being locally logged in. Here, if it is determined that it is locally logged in, the processing proceeds to step S1005, and the CPU 211 transmits a logout request to the MFP 101. More specifically, in addition to writing a user name to the UserName 506, a value "4" indicating a logout request (TABLE 7) is written to the RequestID 508. Then the processing proceeds to step S1006, the Bluetooth connection with the MFP 101 is disconnected, and this processing terminates. Meanwhile, if in step S1004 not being locally logged in is determined, a logout request is not transmitted, the processing proceeds to step S1006, the Bluetooth connection with the MFP 101 is disconnected, and this processing terminates.

By virtue of the above explained processing, by simply causing the mobile terminal 102 to approach the MFP 101, which is set in advance, it is possible to log in to the MFP 101 and use the MFP 101. Here when the MFP 101 is being used by another user, it is possible to present selectable substitution functions to the user, who possesses the mobile terminal 102, and the user can cause the substitution function by be executed by selecting it. After logging into the MFP 101, because the user who possesses the mobile terminal 102 is automatically logged-out from the MFP 101 when the user separates from the MFP 101 by a predetermined distance, it is possible to prevent situation in which the user forgets to logout after logging in.

FIG. 11 is a flowchart for describing operation of local login processing in the MFP 101 according to the first embodiment. Note that inasmuch as it is not mentioned particularly, the CPU 201 is the subject of operation of the MFP 101. Inasmuch as it is not mentioned particularly, the software subject is the login service 312 or the platform 301 performs substitute processing when the login service 312 calls an API provided by the platform 301.

Upon the start of reception of a local login request, the CPU 201 enables login that uses the keyboard, login via the IC card, and a mobile login. More specifically, in step S1101 the CPU 201 enables login using the keyboard, displays the login screen on the console unit 205, and sets a state in which a login operation by the user can be detected. For login using the IC card, step S1102 the CPU 201 sets a state in which the IC card can be detected by the IC card reader 208. For login via mobile, in step S1103 the CPU 201 publishes a user authentication service defined by a Bluetooth GATT profile, and sets a state in which a focal login request via Bluetooth can be detected.

Thus the processing proceeds to step S1104 and when the CPU 201 detects the login request from any of these, the processing proceeds to step S1105. In step S1105 the CPU 201 specifies an issuing source of that login request, and performs authentication processing that corresponds to the issuing source of the login request.

If, in step S1105, the CPU 201 determines that there is a login that uses the keyboard of the console unit 205, the processing proceeds to step S1106, and the CPU 201 detects an operation via the login screen displayed on the console unit 205, and obtains the user name and password input via the login screen. Next, the processing proceeds to step S1107, the CPU 201 performs authentication of the user by comparing/matching that obtained value with information registered in the list of user information shown in the previously described TABLE 1, for example, that is already registered in the MFP 101 in advance, and the processing proceeds to step S1116.

Meanwhile, if in step S1105 the CPU 201 determines a login via the IC card, the processing proceeds to step S1108, and when the CPU 201 detects that the IC card is held up to the IC card reader 208, the IC card number thereof is obtained. Then the processing proceeds to step S1109, and the CPU 201 compares/matches the obtained the IC card number with the IC card numbers registered in the user information list (refer to TABLE 1) already registered in the MFP 101 in advance, performs authentication of the user who possesses that IC card, and the processing proceeds to step S1116.

In step S1105 if the CPU 201 determines a mobile (mobile terminal) login, the processing proceeds to step S1110, and the CPU 201 detects that an ID that indicates a login request is written in the RequestID 508 of the user authentication service 501. Then the CPU 201 obtains the level of the login request (TABLE 7) from the value written in the RequestID 508, compares it to login permission/prohibition state of TABLE 2, and determines whether or not it is a login request level that can be accepted. Here, for example, for a login request of level 1, if the login permission/prohibition state is not such that it is possible to login (StatusID=1) but rather is StatusID=2 or 3, then the login processing is cancelled. For a login request of level 2, if the login permission/prohibition state indicates that the login request level 2 is not accepted (StatusID=3), then similarly the login processing is cancelled. Here, if the login processing is cancelled, the processing proceeds to step S1115, the CPU 201 sets a value "3" that indicates cancellation for the ResultID 509 (TABLE 8), and the mobile terminal 102 that is performing the login request is notified of the cancellation via a Notification. In addition, if, in step S1110, there was a login request of level 3, then the login request is accepted unconditionally. Thus if, in step S1110, the CPU 201 determines that there is an acceptable the login request level, the processing proceeds to step S1111, and the CPU 201 determines whether or not another user is locally logged in. Here if it is determined that another user is logged in, the processing proceeds to step S1112, the CPU 201 executes processing to forcibly logout the logged-in user, and the processing proceeds to step S1113. In addition, in step S1111, when another user is not logged in, the processing also proceeds to step S1113. In step S1113 the CPU 201 refers to the UserName 506 and the Password 507 written from the mobile terminal 102, and obtains the user name and the password. Next, the processing proceeds to step S1114, and the CPU 201 performs authentication of the user by comparing/matching those obtained values with information recorded in the list of user information that is already registered in the MFP 101 in advance. Next, the processing proceeds to step S1115, the CPU 201 sets the authentication result of the user to the ResultID 509, and transmits by a Notification a result of the login processing to the mobile terminal 102 that performed the login request, and then the processing proceeds to step S1116.

In step S1116 the CPU 201 determines success/failure of the user authentication; if it is determined that the authentication failed, then the processing returns to the start of the flowchart of FIG. 11, and detection of a subsequent login request is waited for. Meanwhile, if, in step S1116, the CPU 201 determines that authentication of the user is succeeded, then the processing proceeds to step S1117. In step S1117, the CPU 201 updates the StatusID 505 of the login permission/prohibition state to a value "2" that indicates "login request level 1 is not accepted because another user is logged in". Then the processing proceeds to step S1118, and the CPU 201 transitions display of the console unit 205 from the login screen to the menu screen, and this login processing terminates.

Note that here if it is configured so that the mobile terminal 102 reliably checks the login permission/prohibition state of the MFP 101 beforehand and there is no performing of the login request to the MFP 101 incorrectly, determination of the login request level in step S1110 is not necessarily needed.

Next explanation is given of a logout operation in the MFP 101.

FIG. 12 is a flowchart for illustrating operation of logout processing in the MFP 101 according to the first embodiment. Note that inasmuch as it is not mentioned particularly, the CPU 201 is the subject of operation of the MFP 101. Inasmuch as it is not mentioned particularly, the software subject is the login service 312, or the platform 301 performs substitute processing when the login service 312 calls an API provided by the platform 301.

Upon the user performing the local login, the MFP 101 starts logout acceptance. Here, as a method of logging-out, manual logout, logout by the timer 223, and mobile logout are enabled. More specifically, for manual logout, in step S1201 the CPU 201 displays a logout button 410 (FIG. 4) on the console unit 205, and enters a state in which a press of the logout button 410 by the user can be detected. For logging-out by the timer 223, in step S1202 the CPU 201 enters a state in which an absence of an operation by a user in a fixed interval in accordance with timer processing can be detected. For logout by the mobile, in step S1203 the CPU 201 enters a state in which writing of the logout request in the RequestID 508 can be detected via Bluetooth from the mobile terminal.

Then the processing proceeds to step S1204 and when the CPU 201 detects the logout request, the processing proceeds to step S1205. In step S1205, the CPU 201 determines which one of manual, timer, or mobile the logout request is, and then performs processing that corresponding to the logout request.

If in step S1205, the CPU 201 detected a press of the logout button 410, the processing proceeds to step S1206, and logout processing is performed. Next, the processing proceeds to step S1207 and the CPU 201 updates the StatusID 505 of the login permission/prohibition states to a value "3", which indicates "Login request levels 1 and 2 are not accepted because it is immediately after a logout". Next, the processing proceeds to step S1208 and the CPU 201 activates the timer 223 to check the progress of time. Then the processing proceeds to step S1209, and the CPU 201 causes a transition of the display of the console unit 205 to the login screen. At this point, a state in which login using keyboard, login using IC card, and login that uses a login request level 3 from Bluetooth are possible is entered. Thereafter, in step S1210 when the CPU 201 detects the passing of a fixed interval (for example, 10 seconds) by the timer 223, and there was no login request in a fixed interval, the processing proceeds to step S1211. In step S1211, the CPU 201 updates the StatusID 505 of the login permission/prohibition state to a value "1" that indicates "login is possible". Thereby, a state in which all login methods are enabled is returned to.

Meanwhile, if in step S1205 the CPU 201 detects that there has been no user operation in the fixed interval in accordance with timekeeping by the timer 223, the processing proceeds to step S1212, and the CPU 201 performs logout processing. Next, the processing proceeds to step S1213, and the CPU 201 updates the StatusID 505 of the login permission/prohibition state to a value "1" that indicates "login is possible". Then in step S1214, the CPU 201 displays the login screen on the console unit 205, and this processing terminates.

In addition, if in step S1205 the CPU 201 detects writing of the user name to the UserName 506 via Bluetooth from the mobile terminal 102 and that the logout request is written in the RequestID 508, the processing proceeds to step S1215. In step S1215 the CPU 201 detects logout by mobile, and determines whether the logged in user name and the user name written to the UserName 506 are the same. If it is determined here that the user names do not match, that logout request is cancelled, the start of this flowchart is returned to, and the next logout request is waited for. If in step S1215 it is determined that the user names match, the processing proceeds to step S1216 and the CPU 201 performs logout processing. Next, the processing proceeds to step S1217, and the CPU 201 updates the StatusID 505 of the login permission/prohibition state to a value "1" that indicates "login is possible". Then in step S1218, the CPU 201 displays the login screen on the console unit 205, and this processing terminates.

FIG. 13 is a flowchart for describing operation in a case in which the MFP 101 according to the first embodiment receives a login request for Bluetooth service access from the mobile terminal 102. Note that inasmuch as it is not mentioned particularly, the CPU 201 is the subject of operation of the MFP 101. Inasmuch as it is not mentioned particularly, the software subject is the login service 312 or the platform 301 performs substitute processing when the login service 312 calls an API provided by the platform 301.

This processing is started in step S1301 by the CPU 201 detecting that a "login request for Bluetooth service access" has been written in the RequestID 508 of the user authentication service 501. Next, the processing proceeds to step S1302, and the CPU 201 refers to the UserName 506 and the Password 507 written from the mobile terminal 102, and obtains the user name and the password, which are the authentication information of the user. Then, the processing proceeds to step S1303, and the CPU 201 performs authentication of the user by comparing/matching values obtained in step S1302 with information recorded in the list of user information (TABLE 1) that is already registered in the MFP 101 in advance. Then in step S1304 the CPU 201 determines the success/failure of the user authentication, and if authentication of the user succeeded, the processing proceeds to step S1305 and the CPU 201 sets a state in which, in the same Bluetooth connection. Find is possible for the print service from the mobile terminal 102. Meanwhile, if, in step S1304, the CPU 201 determines that authentication of the user is failed, then the processing proceeds to step S1308. Continuing on from step S1305, the processing proceeds to step S1306, and the CPU 201 determines the role of the authenticated user. Here, if the role of the user is an administrator, the processing proceeds to step S1307, and a state in which, in the same Bluetooth connection interval and connection, a Find from the mobile terminal 102 is possible for the maintenance service is set, and then the processing proceeds to step S1308. Meanwhile, if, in step S1306, the CPU 201 determines the role of the user is not administrator, then the processing proceeds to step S1308.

In step S1308, the CPU 201 sets the authentication result of the user to the ResultID 509, and transmits by a Notification a result of the login processing to the mobile terminal 102 that performed the login request. Thereafter, the processing proceeds to step S1309, and if the CPU 201 detects disconnection of Bluetooth, the processing proceeds to step S1310, and the CPU 201 resets the exposed state of the service. More specifically, a return is made to a state in which Find is not possible for the print service and the maintenance service via Bluetooth.

By virtue of this processing, when the user of the mobile terminal issues a login request for Bluetooth service access to the MFP from the mobile terminal, and if the login is authorized, it is possible to use a service such as printing that the MFP has.

FIG. 14A-FIG. 14D depict views explaining example states of the mobile terminal and the MFP 101 according to the first embodiment of the present invention. Below, explanation is given with reference to FIG. 14A-FIG. 14D of effects according to the first embodiment.

FIG. 14A indicates a state in which a user (Alice) has approached the MFP 101 while holding the mobile terminal 102, in a state in which no-one is logged into the MFP 101. In such a case, when it is detected that the mobile terminal 102 of Alice has entered a distance of within 2 m from the MFP 101, a login request is performed to the MFP 101. Accordingly, login is complete at the point in time that Alice has reached the front of the console unit 205 of the MFP 101, and because of the login Alice can use the MFP 101 immediately without being caused to wait in front of the console unit 205. In addition, in a case where Alice, holding the mobile terminal 102, separates from the MFP 101, because she is automatically logged out when she separates from the MFP 101 by 5 m or more, it is possible to prevent forgetting to logout.

FIG. 14B shows a state in which a user (Alice) approaches the MFP 101 while holding the mobile terminal 102, when a user who possesses the mobile terminal 103 (Bob) is using the MFP 101. In such a case, because the MFP 101 is in use, Alice's the mobile terminal 102 cannot perform a login request to the MFP 101. Accordingly, the mobile terminal 102 docs not impede use of the MFP 101 by Bob. However, because substitution functions are presented to the mobile terminal 102 of Alice, Alice is also able to use a function of the MFP 101 in the range of the functions provided by the substitution functions.

FIG. 14C shows a case in which Alice approaches the MFP 101 while holding the mobile terminal 102, to which a user (Carol) is still logged in because Carol forgot to logout although she has finished using of the MFP 101. In such a case, when the distance between the MFP 101 and the mobile terminal 102 is 30 cm to 2 m, the mobile terminal 102 of Alice does not perform a login request. However, when Alice reaches the console unit 205 of the MFP 101 and the distance between the MFP 101 and the mobile terminal 102 becomes within 30 cm, the mobile terminal 102 of Alice performs a login request to the MFP 101. Thereby, the MFP 101 causes Carol to be forcibly logged out, find Alice is allowed to login. Thereby it is possible to prevent incorrect usage of the MFP 101 by Alice while Carol is logged in. In addition, there is no need for Alice to press the logout button 410 displayed on the console unit 205 instead of Carol.

FIG. 14D shows a state immediately after the logout button 410 displayed on the console unit 205 of the MFP 101 is pressed. In such a case, even if the mobile terminal 103 of Bob is closely located, the mobile terminal 103 of Bob does not perform a login request. Accordingly, in a situation where Alice is in front of the console unit 205 of the MFP 101, it safe as login is not performed by the mobile terminal 103 of Bob. In addition, in a case in which immediately after Alice herself performs the logout operation—the user who pressed the logout button 410 is Alice—and she wishes to log in to the MFP 101 again, Alice causes the mobile terminal 102 to approach to a distance within 10 cm from the MFP 101. Thereby, the mobile terminal 102 of Alice performs a login request to the MFP 101. Thus Alice can log in to the MFP 101 again even immediately after logging-out.

Second Embodiment

Next, explanation is given of the second embodiment of the present invention. The second embodiment illustrates an example in which a method of communication that is more secure than the communication shown in the detailed flow at the time of login shown in the first embodiment is performed. Note that a configuration of the mobile terminals 102, 103 or the MFP 101 according to the second embodiment, and a system configuration thereof are similar to those of the previously described first embodiment, and explanation thereof is omitted.

FIG. 15 depicts a view for describing characteristics and a user authentication service according to Bluetooth, provided by the MFP 101 according to the second embodiment of the present invention. Here portions in common with the previously described FIG. 5 are denoted by the same numerals. In the second embodiment, the user authentication service of the MFP 101 comprises the following two characteristics instead of the Password 507 of the previously described first embodiment. Other parts are similar to the previously described first embodiment.

Challenge 1501

A characteristic used for storage of a challenge. This value stores a random number that the MFP 101 issues each time.

Hash 1502

A characteristic used for storage of a hash value.

The second embodiment implements user authentication of a challenge-response authentication scheme that uses a Bluetooth characteristic to prevent improper obtainment of a password via packet sniffing or MFP spooling.

FIG. 16 depicts a view for describing a sequence for when the mobile terminal 102 performs a login request to the MFP 101 according to the second embodiment. With reference to FIG. 16, explanation is given of a usage approach for the characteristics of the user authentication service according to the second embodiment. Note that basic operation of the mobile terminal 102 here is similar to FIG. 7 according to the first embodiment.

Upon starting the login request processing of step S705, the mobile terminal 102 issues a Read request for the Challenge 1501 in step S1601, and in step S1602 obtains a value of the challenge. Next, in step S1603 the mobile terminal 102 uses the obtained challenge and the user's password to calculate a hash value. As an algorithm to generate the challenge and calculate the hash value here, there is the Challenge-Response Authentication Mechanism (CRAM) as recited in RFC 2195 or the like, but the present invention is not limited to this. Next in step S1604 the mobile terminal 102 writes the user name to the UserName 506 and writes the calculated hash value to the Hash 1502, and also writes the login request to the RequestID 508. Thereby, the MFP 101 detects this login request, and reads the user name, hash value, and challenge from the characteristics. After reading these values, these values are cleared so that they cannot be referenced when another terminal accesses. Then in step S1605 the MFP 101 uses the user name, hash value, and challenge obtained from the characteristics to perform user authentication processing. More specifically, the challenge set in the characteristic and the user password registered in the user database am obtained, and a hash value is calculated by using the same algorithm as the mobile terminal 102. Then that calculated hash value and the hash value obtained from the characteristic are verified. When the MFP 101 thus completes authentication of the user, in preparation for subsequent authentication, the MFP 101 updates the challenge of the characteristic with a new value. Thereafter, operation after user authentication is similar to in the first embodiment.

By the second embodiment, as explained above, a challenge-response scheme user authentication via Bluetooth is implemented, which is more secure than in the first embodiment, and a effect of being able to prevent an improper obtainment of a password via packet sniffing or MFP spoofing is obtained.

Third Embodiment

In the previously described first embodiment, regarding the manual logout of step S1206-step S1211 of FIG. 12, by configuring so as to not accept anything besides the login request level 3 immediately after the manual logout, a problem occurring immediately after the logout is solved.

A method according to the third embodiment by which the same effect is obtained is shown in FIG. 17. Note that a configuration of tire mobile terminals 102, 103 or the MFP 101 according to the third embodiment, and a system configuration thereof are similar to those of the previously described first embodiment, and explanation thereof is omitted.

FIG. 17 is a flowchart for describing manual logout processing by the MFP 101 according to the third embodiment. Note that inasmuch as it is not mentioned particularly, the CPU 201 is the subject of operation of the MFP 101. Inasmuch as it is not mentioned particularly, the software subject is the login service 312 or the platform 301 performs substitute processing when the login service 312 calls an API provided by the platform 301.

Firstly, in step S1701, the CPU 201 detects a press of the logout button 410, logout processing is performed. Next, the processing proceeds to step S1702 and the CPU 201 stops output of Bluetooth Advertising Packets. Next, the processing proceeds to step S1703 and the CPU 201 activates the timer 223 to check the elapse of time. Then the processing proceeds to step S1704, and the CPU 201 causes a transition of the display of the console unit 205 to the login screen. At this point, a state in which login using keyboard, login using IC card, and login that uses a login request level 3 from Bluetooth are possible is entered. Thereafter, in step S1705 when the CPU 201 detects the passing of a predetermined time period (for example, 10 seconds) by the timer 223, and there was no login request in the predetermined time period, the processing proceeds to step S1706. In step S1706, after a manual logout, the CPU 201 resumes output of the Advertising Packet after the predetermined time period has elapsed.

Thereby, while the MFP 101 stops output of the Advertising Packet, the mobile terminal 102 cannot detect the distance to the MFP 101. Thereby, when the MFP 101 is executing manual operation logout processing, the mobile terminal 102 can be prevented from making the login request to the MFP 101.

Fourth Embodiment

The above described first to third embodiments illustrate examples in which the mobile terminal 102 confirms the permission/prohibition state for login to the MFP 101, and determines whether or not to perform the login request. For example, the determination of step S704 of FIG. 7 corresponds to this. In contrast to this, the fourth embodiment illustrates an example of a case in which the mobile terminal 102 does not perform determining of login permission/prohibition, but entrusts the determination of login permission/prohibition to the MFP 101. Note that a configuration of the mobile terminals 102, 103 or the MFP 101 according to the fourth embodiment, and a system configuration thereof are similar to those of the previously described first embodiment, and explanation thereof is omitted.

FIG. 18A and FIG. 18B depict views for describing characteristics provided by user authentication services of the MFP 101 according to the fourth embodiment of the present invention. Portions here in common with the previously described FIG. 5 and FIG. 15 are denoted with the same numerals, and explanation thereof is omitted. The user authentication services of the MFP 101 according to the fourth embodiment is provided with a Distance 1801 and a Distance 1802 in which to write a distance calculated by the mobile terminal 102, in addition to the characteristics of the above described first embodiment and second embodiment. Regarding the login request, there is no need for the levels (level 1 to level 3) as shown in the previously described first embodiment, and one RequestID that indicates the login request is used. Note that the MFP 101 according to the fourth embodiment is assumed to be something that stores in advance a list of login permission/prohibition states of the fourth embodiment as shown in the following TABLE 11 as a setting.

TABLE 11

LIST OF LOGIN PERMISSION/PROHIBITION STATES

| STATUSID | MEANING |
|---|---|
| 1 | LOGIN IS POSSIBLE |
| 2 | LOGIN REQUEST FROM A MOBILE TERMINAL AT A DISTANCE OF 2 m TO 30 cm IS NOT ACCEPTED BECAUSE ANOTHER USER IS LOGGED IN. |
| 3 | LOGIN REQUEST FROM A MOBILE TERMINAL AT A DISTANCE OF 2 m TO 10 cm IS NOT ACCEPTED BECAUSE IMMEDIATELY AFTER A LOGOUT |

Operation of the mobile terminal 102 according to the fourth embodiment is the same as that explained with the flowchart of FIG. 6 of the previously described first embodiment, so explanation thereof is omitted.

FIG. 19 is a flowchart for describing detail of processing of step S608 of FIG. 6 according to the fourth embodiment. With reference to FIG. 19, explanation is given of a detailed flow of step S608 in the fourth embodiment.

When the CPU 211 of the mobile terminal 102 starts processing for using the MFP 101, firstly in step S1901 the CPU 211 connects via Bluetooth to the MFP 101. Next, the processing proceeds to step S1902 and the CPU 211 obtains Bluetooth service information from the MFP 101. In the fourth embodiment, at this point in time it is possible to obtain information of the user authentication service 501 and the MFP information service 502. Next, the processing proceeds to step S1903, and the CPU 211 issues a login request to the MFP 101. In the fourth embodiment, at a time of this login request, the distance to the MFP 101 that the CPU 211 of the mobile terminal 102 calculates is written to Distance (1801 or 1802). Next, the processing proceeds to step S1904, and the CPU 211 receives by a Notification an update of the ResultID and the StatusID as a result of the login processing from the MFP 101.

In step S1905, the CPU 211 determines success/failure of the login from the received result. Then if it is determined that the login succeeded here, the processing proceeds to step S1906, and the CPU 211 disconnects the connection via Bluetooth with the MFP 101, and this processing terminates.

Meanwhile, if in step S1905 the CPU 211 determines that the login failed, the processing proceeds to step S1907, and the CPU 211 presents usable functions as the substitution functions to the user instead of local login to the MFP 101. This is similar to the previously described FIG. 8. Next the processing proceeds to step S1908, and the CPU 211 determines whether or not the user hits selected a substitution function. Here, if the user did not select a substitution function but pressed the cancel button 804, the processing proceeds to step S1906, and the CPU 211 disconnects the connection via Bluetooth with the MFP 101, and terminates this processing. Meanwhile, if in step S1908 the CPU 211 determines that the user selected a substitution function, the processing proceeds to step S1909, and as explained with reference to the flowchart of the previously described FIG. 9, the substitution function selected by the user is provided to the user. After provision of the substitution function, the processing proceeds to step S1906, and the CPU 211 disconnects the unnecessary connection via Bluetooth to the MFP 101, and this processing terminates.

FIGS. 20A and 20B are flowcharts for describing operation of local login processing in the MFP 101 according to the fourth embodiment. Note that in FIGS. 20A and 20B, processing that is the same processing of the previously explained FIG. 11 is given the same numeral, and explanation thereof is omitted. In the previously described first embodiment, the MFP 101, having receiving the login request, in step S1110 of FIG. 11 compares tire login request level and the login permission/prohibition state and determines whether the login request level is a level that can be accepted.

In contrast to this, when the CPU 201 of the MFP 101 according to the fourth embodiment detects the login request from the mobile terminal 102, the processing proceeds to step S2001, and the CPU 201 obtains distance information written in the Distance (1801, 1802). Next, the processing proceeds to step S2002, and the CPU 201 refers to the list of login permission/prohibition states of the fourth embodiment (TABLE 11), and then determines whether or not the distance between the mobile terminal 102 and the MFP 101 is a distance at which the login request is accepted. For example, if the obtained distance is between 2 m and 30 cm, from TABLE 11, when the login permission/prohibition state is not the value "1" that shows that login is possible but shows "2" or "3", it is determined that login is not possible, and the login processing is cancelled. For example, if the obtained distance is between 30 cm and 10 cm, if the login permission/prohibition state shows "3", then it is determined that login is not possible, and the login processing is cancelled. When the login processing is cancelled, a value "3" that indicates that the login w as cancelled is set to the ResultID, and in step S2003 the result is communicated to the mobile terminal 102.

According to the fourth embodiment as explained above, because the mobile terminal 102 does not need to perform determination or processing in accordance with the distance to the MFP 101, there is the effect that processing of the mobile terminal 102 can be simplified.

Fifth Embodiment

Next, explanation is given of a fifth embodiment of the present invention. In the previously described first to fourth embodiments, the MFP 101 transmits an advertisement packet, and the mobile terminal 102 receives this and obtains the distance between the MFP 101 and the mobile terminal 102. In contrast to this, in the fifth embodiment explanation is given of an example in which the mobile terminal 102 transmits the advertisement packet, and the MFP 101 receives this, and the MFP 101 obtains the distance between the MFP 101 and the mobile terminal 102. Note that while explanation is given of processing between the mobile terminal 102 and the MFP 101, of course the same can be performed in the case of the mobile terminal 103 as in the previously described embodiments.

FIG. 21 is a block diagram for explaining a hardware configuration of the MFP 101 according to the fifth embodiment of the present invention. Note that the hardware configuration of the mobile terminal 102 and the configuration of the system that includes the MFP 101 and the mobile terminal 102 are similar to the previously described first embodiment, so explanation thereof is omitted. Because the MFP 101 according to the fifth embodiment is basically the same as the MFP 101 according to previously described embodiments, portions in common with the previously described FIG. 2 are denoted with the same reference numerals, and explanation thereof is omitted.

Configuration of a control unit 2100 of the MFP 101 is as below. Via a system bus 2114, the CPU 201, the RAM 203, the ROM 202, an SRAM 2101, the network interface 210, an RIP 2103, a scanner image processor 2104, a printer image processor 2105, and a storage controller 2108 are connected. The CPU 201 is connected to the console unit 205 via a UART interface 2102, and connected to a Bluetooth module 2113 of the console unit 205 via a USB interface 2109 and a USB connector 2110. The scanner image processor 2104 receives, via a scanner I/F 2106, the image data obtained by reading the original using the scanner 207, performs image processing, and then outputs to the system bus 2114. The printer image processor 2105, after performing color conversion or the like, in accordance with characteristics of the printer 206, on image data received via the system bus 2114, outputs the image data to the printer 206 via a printer I/F 2107 to cause it to be printed. The storage controller 2108 controls access to the HDD 204. The CPU 201 executes processing explained later by executing a boot program stored in the ROM 202 to load an OS, a program, or the like, installed in the HDD 204 into the RAM 203 and executing.

Next, explanation is given of the configuration of the console unit 205.

A sub-CPU 2111 controls operation of the console unit 205. A display panel 2112, as a display panel that comprises a touch panel function, accepts a user operation, and then notifies the sub-CPU 2111. A ROM 2115 stores programs executed by the sub-CPU 2111, various data, or the like. A RAM 2116 provides a work area that stores various data at a time of execution of processing by the sub-CPU 2111. The Bluetooth module 2113 communicates in accordance with a Bluetooth specification with the Bluetooth I/F 215 of the mobile terminal 102.

Based on the above configuration, operation of the MFP 101 is explained simply. PDL data, which is print data transmitted via the LAN 104, is received by the network interface 210. The CPU 201 temporarily writes the received PDL data to the RAM 203, and then stores it in the HDD 204 via the storage controller 2108. The PDL data stored in the HDD 204 is converted by the CPU 201 to a display list, and once again written to the HDD 204 via the RAM 203. Next the display list of the HDD 204 is read by the CPU 201, sent to the RIP 2103, converted to raster data, and once again written to the HDD 204. In this way, a print job input to the MFP 101 is printed by the printer 206 by the user logging into the MFP 101 via a login method explained later. Upon this printing, the raster data is read from the HDD 204 via the system bus 2114, and after density, screen processing, or the like is performed on it by the printer image processor 2105, it is output to the printer 206 via the printer I/F 2107.

Next, a procedure by which the user logs into the MFP 101 is explained.

The CPU 201 controls the Bluetooth module 2113 via the USB connector 2110. More specifically, an Advertising Packet of a Bluetooth Low Energy communication transmitted from the mobile terminal 102 is received, and a service is executing in response to a login request, a print job input, or the like from the mobile terminal 102. By authentication on the MFP 101 by the mobile terminal 102 that the user possesses, the user can not only execute the print job, but can also cause a transition of the operation screen of the MFP 101 to an operation menu screen or the like, and obtain authorization to use the MFP 101.

Next, explanation is given of communication processing with the mobile terminal 102 by the MFP 101 according to the fifth embodiment.

FIGS. 22A and 22B are flowcharts for describing processing from allowing a user of the mobile terminal 102 to login upon a signal from the mobile terminal 102 to the MFP 101, until logout according to the fifth embodiment. Note that the program that executes this processing is stored in the HDD 204, and is deployed into the RAM 203 and executed by the CPU 201 at a time of execution.

In the fifth embodiment, the MFP 101 and the mobile terminal 102 use a Bluetooth Low Energy communication standard to mutually communicate. Here, a service requested of the MFP 101 by the mobile terminal 102 includes control so as to automatically log in in accordance with a user ID transmitted from the mobile terminal 102, which is located within a predetermined distance from the MFP 101, and automatically logout when they become further apart than a predetermined distance.

Firstly in step S2201, the CPU 201 transitions to a standby state of Bluetooth Low Energy. Next the processing proceeds to step S2202, and the CPU 201 determines whether or not the state is such that authentication of the user is possible. If authentication of the user is possible, the processing proceeds to step S2203, otherwise user authentication becoming possible is waited for, and then the processing proceeds to step S2203. In step S2203, the CPU 201 determines whether or not the service for which the request from the mobile terminal 102 was received is set so that authentication processing is possible. If it is not set, the processing proceeds to step S2204, the administrator is prompted so as to set that authentication can be performed, and the processing proceeds to step S2203. Thus, if in step S2203 the service for which the request from the mobile terminal 102 was received is already set, the processing proceeds to step S2205, and the CPU 201 determines whether or not a distance that is a criterion of logging in is set. If it is determined that it is not set, the processing proceeds to step S2206, and the administrator of the MFP 101 is allowed to set it by prompting the administrator to set the distance. Thus, when the distance, which is a condition for connecting to the transmission source of the received Bluetooth Advertising Packet, is set in the MFP 101, the processing proceeds to step S2207. In step S2207, the CPU 201 transitions to a scanning state, and enters a wait to receive the Advertising Packet. If in step S2208 the CPU 201 receives the Advertising Packet, the processing proceeds to step S2209, and the received Advertising Packet is analyzed. Here the CPU 201 obtains a distance from the transmission source, a service UUID, and a user ID. The processing proceeds to step S2210, and the CPU 201 determines whether or not the distance front the transmission source of the received Advertising Packet is within the value set in step S2205. If determined to be within the set value, the processing proceeds to step S2211, otherwise the processing proceeds to step S2208. Configuration may be taken such that the set distance is changed in accordance with the user ID. In other words, as explained in the first embodiment, configuration may be taken to set the distance of a user A who always works neighboring the MFP 101 as for example 30 cm, and to set the distance for other users as for example, 2 m. Accordingly, in such a case, in step S2210, it is determined whether or not it is within a connection distance in accordance with the user ID. In step S2211 the CPU 201 determines whether or not die service UUID recited in the received Advertising Packet is for a service that is set to the MFP 101 and can be supported, and in such a case determines whether or not it is a request for an authentication service. In such a case, the processing proceeds to step S2212; otherwise the processing proceeds to step S2208.

In step S2212, the CPU 201 transitions to an Init state, the processing proceeds to step S2213, and the CPU 201 transmits a Connect Req (connection request) packet to the mobile terminal 102 that transmitted the Advertising Packet. In step S2214, when the Connect Req (connection request) packet is received from the mobile terminal 102, the processing proceeds to step S2215. In step S2215, the CPU 201 executes login processing with the user ID requested from the mobile terminal 102. Here, the list of user information of the previously described TABLE 1 is referred to, and whether to permit login of the user is determined. The processing proceeds to step S2216, and the CPU 201 makes a notification of authentication success or authentication failure, which is the result of the login processing, to the mobile terminal 102. Next, the processing proceeds to step S2217 and the CPU 201, similarly to in step S2207, transitions to the scanning state, in step S2218 waits for reception of the Advertising Packet; when the Advertising Packet is received, the processing proceeds to step S2219. In step S2219, the CPU 201, similarly to in step S2209, analyzes the received the Advertising Packet, and obtains the distance from the transmission source, the service UUID, and obtains the user ID. Next the processing proceeds to step S2220, and the CPU 201 determines whether or not it is the distance at which to logout. If in step S2220, the CPU 201 determines that the transmission source of the Advertising Packet received in step S2218 is the same as the logged-in user ID, and is at a predetermined distance or greater, then the processing proceeds to step S2221. In step S2221, the CPU 201 logs out the user of the mobile terminal 102 and the processing returns to step S2201.

In this way, the user of the mobile terminal 102, by simply approaching the MFP 101 to a distance set in advance in a state of holding the mobile terminal 102, it is possible to log in to the MFP 101. Here, the user information that is authenticated, the service UUID that can be accepted, and the distance to the transmission source at which login is possible are registered in the MFP 101 in advance.

Next, explanation is given of operation in the mobile terminal 102 according to the fifth embodiment.

FIG. 23 is a flowchart for describing processing by which the mobile terminal 102 logs into the MFP 101 according to the fifth embodiment. Note that the program that executes this processing is stored in the flash memory 213, and is deployed into the RAM 212 and executed by the CPU 211 at a time of execution.

Firstly, in step S2301, the CPU 211 activates an application stored in the mobile terminal 102. The activation of this application is performed by the user operating the mobile terminal 102. Next, the processing proceeds to step S2302 and the CPU 211 determines whether or not the user ID for logging in to the MFP 101 has been set. Here, if it is determined that the user ID has not been set, the processing proceeds to step S2303, the CPU 211 prompts the user to set the user ID for which authentication is desired in the mobile terminal 102, and the processing proceeds to step S2302. Thus, if a state in which the user ID has been set is entered, the processing proceeds to step S2304, and the CPU 211 determines whether or not the service UUID to request of the MFP 101 has been set, which here is whether a request of the authentication service of the MFP 101 has been set. If it is determined that it is not set, the CPU 211 advances the processing to step S2305, prompts the user of the mobile terminal 102 to set the service UUID, and then the processing proceeds to step S2304. Thus, if in step S2304 a state in which the service ID is set is entered, the processing proceeds to step S2306, and the CPU 211 transitions to a state of transmitting the Advertising Packet.

Next, the processing proceeds to step S2307, and the CPU 211 waits for reception of a Connect Req packet from the MFP 101; when the Connect Req packet is received, the processing proceeds to step S2308, and the CPU 211 transitions to a state of connection to the MFP 101. The processing proceeds to step S2309, the CPU 211 transmits the Connect Req packet to the MFP 101, advances the processing to step S2310, and waits for reception of the authentication result of whether the login processing succeeded. When the authentication result is received in step S2310, the processing proceeds to step S2311 and detail of the result is displayed on the console unit 214 of the mobile terminal 102. Here, if authentication succeeded, for example "logged in" is displayed, and if authentication failed "login failed" or the like is displayed. The processing proceeds to step S2312, the CPU 211 transitions to an advertizing state, and the processing proceeds to step S2307.

In this way the user of the mobile terminal 102 can execute processing to log in to the MFP 101 by using the user ID set in the mobile terminal 102, simply by causing the mobile terminal 102 to approach the MFP 101.

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-194300, filed Sep. 24, 2014, which is hereby incorporated by reference herein in its entirety.

The invention claimed is:

1. A method of controlling a mobile terminal for receiving a signal of a Bluetooth Low Energy (BLE) standard from a printer, the method comprising:
    transmitting a login request to the printer based on a radio field intensity of the received signal,
    wherein, in the transmitting, in a case that there is no user that has logged in the printer and the mobile terminal is located within a predetermined distance from the printer, the login request is transmitted to the printer, and
    wherein, in the transmitting, in a case that there is a user that has logged in the printer and the mobile terminal is located within the predetermined distance from the printer, the login request is not transmitted to the printer and information indicating that the user of the mobile terminal cannot log in the printer is displayed.

2. The method according to claim 1, wherein the login request is not transmitted to the printer in a case that the radio field intensity of the received signal is less than a predetermined value.

3. The method according to claim 1, wherein the login request includes at least user identification information of the user of the mobile terminal and a password.

4. A mobile terminal that communicates with a printer based on communication of Bluetooth Low Energy (BLE), the mobile terminal comprising:
    at least one processor and at least one memory coupled to the at least one processor and having stored thereon instructions that, when executed by the at least one processor, cooperate to act as:
    a login unit that transmits a login request to the printer based on the communication of the BLE;
    a first obtaining unit that obtains a radio field intensity of a received BLE signal received from the printer; and
    a second obtaining unit that obtains status information of the printer from the printer based on the communication of BLE, wherein the status information includes information indicating whether a user is logged in the printer,
    wherein the login unit controls whether or not to transmit the login request to the printer based on at least the radio field intensity of the received BLE signal obtained by the first obtaining unit and the status information obtained by the second obtaining unit.

5. The mobile terminal according to claim 4, wherein the mobile terminal receives a signal of a Bluetooth Low Energy (BLE) standard from the printer,
    wherein the login unit transmits the login request in a case that the radio field intensity of the received BLE signal is greater than a predetermined value.

6. The mobile terminal according to claim 4, wherein, in a case that the received radio field intensity of the received BLE signal is greater than a predetermined value and the received status information indicates that a user is not logged in the printer, the login unit transmits the login request, and
    wherein, in a case that the received radio field intensity of the received BLE signal is greater than the predetermined value and the received status information indicates that a user is logged in the printer, the login unit does not transmit the login request.

7. The mobile terminal according to claim 4, wherein, in a case that the mobile terminal located within a predetermined distance from the printer, wherein the predetermined distance is a distance at which a user of the mobile terminal is able to log in the printer by the login unit in a case that there is no user who is logged in the printer, the login unit transmits the login request.

8. The mobile terminal according to claim 4, wherein the login unit transmits the login request to the printer in a case that the received BLE signal is transmitted from the printer that is registered in the mobile terminal.

9. The mobile terminal according to claim 4, wherein the login request is a local login request for enabling a user of the mobile terminal to make use of a function of the printer via a console unit of the printer.

10. A method of controlling a mobile terminal that communicates with a printer based on communication of Bluetooth Low Energy (BLE), the method comprising:
   transmitting a login request to the printer based on the communication of the BLE;
   obtaining a radio field intensity of a received BLE signal received from the printer; and
   obtaining status information of the printer from the printer based on the communication of the BLE, wherein the status information includes information indicating whether a user is logged in the printer or not,
   wherein in the transmitting, the login request is controlled to be transmitted or not to the printer based on at least the obtained radio field intensity of the received BLE signal and the obtained status information.

11. A non-transitory computer-readable storage medium storing a program for causing a processor to execute a method of controlling a mobile terminal that communicates with a printer based on communication of Bluetooth Low Energy (BLE), the method comprising:
   transmitting a login request to the printer based on the communication of the BLE;
   obtaining a radio field intensity of a received BLE signal received from the printer; and
   obtaining status information of the printer from the printer based on the communication of the BLE, wherein the status information includes information indicating whether a user is logged in the printer or not,
   wherein in the transmitting, the login request is controlled to be transmitted or not to the printer based on at least the obtained radio field intensity of the received BLE signal and the obtained status information.

12. The non-transitory computer-readable storage medium according to claim 11, wherein, in the transmitting, the login request is transmitted to the printer in a case that the received radio field intensity of the received BLE signal is greater than a predetermined value and the received status information indicates that a user is not logged in the printer, and
   wherein, in the transmitting, the login request is not transmitted to the printer in a case that the received radio field intensity of the received BLE signal is greater than the predetermined value and the received status information indicates that a user is logged in the printer.

13. The non-transitory computer-readable storage medium according to claim 11, wherein, in the transmitting, the login request is transmitted to the printer in a case that the mobile terminal located within a predetermined distance from the printer, wherein the predetermined distance is a distance at which a user of the mobile terminal is able to log in the printer based on the login request in a case that there is no user that is logged in the printer.

14. The non-transitory computer-readable storage medium according to claim 11, wherein, in the transmitting, the login request is transmitted to the printer in a case that the received BLE signal is transmitted from the printer that is registered in the mobile terminal.

15. The non-transitory computer-readable storage medium according to claim 11, wherein the login request is a local login request for enabling a user of the mobile terminal to make use of a function of the printer via a console unit of the printer.

16. A method of controlling a printer and a mobile terminal that communicates with the printer based on communication of Bluetooth Low Energy (BLE), the method comprising:
   transmitting a login request from the mobile terminal to the printer based on the communication of the BLE; and
   obtaining, for the mobile terminal, a radio field intensity of a received BLE signal received from the printer;
   obtaining, for the mobile terminal, status information of the printer from the printer based on the communication of the BLE, wherein the status information includes information indicating whether a user is logged in the printer or not; and
   controlling whether or not to perform login processing of the user according to the login request based on at least the obtained radio field intensity and the obtained status information.

17. The method according to claim 16, wherein, in the transmitting, the login request is transmitted to the printer in a case that the received radio field intensity of the received BLE signal is greater than a predetermined value and the received status information indicates that a user is not logged in the printer, and
   wherein, in the transmitting, the login request is not transmitted to the printer in a case that the received radio field intensity of the received BLE signal is greater than the predetermined value and the received status information indicates that a user is logged in the printer.

18. The method according to claim 16, wherein, in the transmitting, the login request is transmitted to the printer in a case that the mobile terminal located within a predetermined distance from the printer, wherein the predetermined distance is a distance at which a user of the mobile terminal is able to log in the printer based on the login request in a case that there is no user that is logged in the printer.

19. The method according to claim 16, wherein, in the transmitting, the login request is transmitted to the printer in a case that the received BLE signal is transmitted from the printer that is registered in the mobile terminal.

20. The method according to claim 16, wherein the login request is a local login request for enabling a user of the mobile terminal to make use of a function of the printer via a console unit of the printer.

* * * * *